(12) United States Patent
Hernandez et al.

(10) Patent No.: US 12,201,074 B2
(45) Date of Patent: Jan. 21, 2025

(54) AUTOMATED PLANT GROWING SYSTEM AND METHODS

(71) Applicant: SIGS, INC., Raleigh, NC (US)

(72) Inventors: Ricardo Hernandez, Raleigh, NC (US); John Jackson, Tucson, AZ (US)

(73) Assignee: SIGS, INC., Raleigh, NC (US)

( * ) Notice: Subject to any disclaimer, the term of this patent is extended or adjusted under 35 U.S.C. 154(b) by 0 days.

(21) Appl. No.: 17/889,771

(22) Filed: Aug. 17, 2022

(65) Prior Publication Data

US 2023/0073284 A1    Mar. 9, 2023

Related U.S. Application Data

(60) Provisional application No. 63/234,177, filed on Aug. 17, 2021.

(51) Int. Cl.
  *A01G 9/24*    (2006.01)
  *A01G 7/04*    (2006.01)

(52) U.S. Cl.
  CPC ............. *A01G 9/246* (2013.01); *A01G 9/247* (2013.01); *A01G 7/045* (2013.01)

(58) Field of Classification Search
  CPC ........ A01G 9/246; A01G 9/247; A01G 7/045; F24F 3/14
  See application file for complete search history.

(56) References Cited

U.S. PATENT DOCUMENTS

| | | | | |
|---|---|---|---|---|
| 4,045,911 A | * | 9/1977 | Ware ...................... | A01G 9/249 47/DIG. 6 |
| 6,360,482 B1 | * | 3/2002 | Boyes .................... | A01G 9/247 47/62 A |
| 10,631,469 B2 | * | 4/2020 | Sahu ...................... | A01G 31/06 |
| 11,096,337 B1 | * | 8/2021 | Wilson ................... | A01G 9/246 |
| 11,297,779 B1 | * | 4/2022 | Lund ...................... | A01G 9/246 |
| 11,337,387 B2 | * | 5/2022 | Adams ................... | A01G 9/247 |
| 11,382,288 B2 | * | 7/2022 | Kim ....................... | A01G 7/045 |
| 11,553,656 B2 | * | 1/2023 | Song ...................... | A01G 7/045 |
| 2004/0206013 A1 | * | 10/2004 | Berg ...................... | A01G 9/16 52/63 |

(Continued)

FOREIGN PATENT DOCUMENTS

| | | | |
|---|---|---|---|
| CN | 211503014 U | * | 9/2020 |
| JP | H10213340 A | * | 8/1998 |

(Continued)

*Primary Examiner* — Magdalena Topolski
*Assistant Examiner* — Brook Victoria Schmid
(74) *Attorney, Agent, or Firm* — KW Law, LLP

(57) ABSTRACT

System, methods, and devices may control air flow, temperature, relative humidity, substrate temperature, substrate moisture, carbon dioxide concentration, photoperiod, irrigation, light intensity, spectrum, and vapor pressure deficit. The system may comprise water and air pumps, sensors, air and water distribution apparatus, lights, heaters, foggers, sensors, and electronic system control dedicated to control the environment on individual or multiple growing platforms. The present disclosure provides the ability to provide microclimate control to optimize the environment at the plant or shelf level to optimize plant yields and production resources. The present disclosure may utilize an open or closed plant production configuration depending on the desired plant outcome and plant species.

19 Claims, 15 Drawing Sheets

(56) References Cited

U.S. PATENT DOCUMENTS

| | | | |
|---|---|---|---|
| 2019/0082627 A1* | 3/2019 | Moffitt | B65D 88/74 |
| 2019/0259108 A1* | 8/2019 | Bongartz | A01G 31/02 |
| 2021/0045295 A1* | 2/2021 | Laeske | A01G 9/247 |
| 2021/0100173 A1* | 4/2021 | Khwaja | H05B 45/12 |
| 2021/0315170 A1* | 10/2021 | Thomas | F24F 11/64 |
| 2021/0360887 A1* | 11/2021 | Neri | A01G 9/1423 |
| 2023/0000027 A1* | 1/2023 | Schaefer | A01G 9/18 |

FOREIGN PATENT DOCUMENTS

| | | | | |
|---|---|---|---|---|
| KR | 100552929 B1 * | 2/2006 | | |
| KR | 20100112295 A * | 10/2010 | | |
| KR | 20120122622 A * | 11/2012 | | |
| NL | 8502868 A * | 5/1987 | | A01G 9/1423 |
| TW | I574609 B * | 3/2017 | | |
| WO | WO-2016164652 A1 * | 10/2016 | | A01G 31/00 |
| WO | WO-2020024054 A1 * | 2/2020 | | A01G 31/06 |
| WO | WO-2020227820 A1 * | 11/2020 | | A01G 7/045 |

\* cited by examiner

AUTOMATED PLANT GROWING SYSTEM AND METHODS

CROSS REFERENCE TO RELATED APPLICATIONS

This application claims priority to U.S. Provisional Patent Application No. 63/234,177 entitled "AUTOMATED PLANT GROWING SYSTEM AND METHODS" and filed on Aug. 17, 2021, which is incorporated by reference herein in its entirety for any purpose.

FIELD

The present disclosure is directed to plant growth, and in particular, to controlling microclimates in growing facilities.

BACKGROUND

Indoor controlled environmental (CE) or vertical farm systems for plant production may provide macroclimate control of the main factory floor where plant production takes place. Such macro environmental conditions including room temperature, room relative humidity, irrigation schedule, lighting and $CO_2$ concentration are controlled within the large-scale building production floor.

Existing CE systems may consist of horizontal plant growing table or shelving systems outfitted with electrical light fixtures and hydroponic irrigation systems. Environmental factors may be measured at selected locations in the macroclimate. Growers may make decisions based on measurements from the selected locations. These room-scale systems allow for varied conditions at different plant locations and different shelf levels within the controlled room. Such systems may not expose each individual plant or plant shelf (microclimate) to the same macroclimate conditions.

Current vertical farms are also limited on the plant species and developmental stages grown at a given time. For example, current systems may not support growing a variety of crops with different environment requirements in one macroclimate. Since the macroclimate is to be maintained at common environmental set point and the microclimate will fluctuate around that macroclimate set point, very limited plant species and environments can be accommodated in one macroclimate. For example, optimal growing temperature for lettuce is 25° C. and for basil is 28° C. If both are grown in the same vertical farm facility, a compromised in temperature will result in sub optimal yield for both plants. In addition, since the macroclimate cannot efficiently accommodate large changes in the environment, limited crop stage optimization is possible. In another example, production of grafted tomato plants may include 3 different environments to support optimized germination, grow-out, healing of grafted union.

BRIEF DESCRIPTION

A device for growing plants includes a rack and a shelf disposed in the rack. The shelf includes a bottom surface and a plurality of side walls extending at an angle from the bottom surface. A grate is disposed over the bottom surface. The grate is configured to support growing containers and is also disposed above a heat exchanger. A light source is above the shelf to light the growing containers. An irrigation delivery system is coupled to the shelf and includes a pump and a reservoir in fluid communication with the pump through a first conduit. The reservoir is in fluid communication with the shelf through a second conduit. An air delivery system is in fluid communication with the shelf. A controller is in electronic communication with the light source, the irrigation delivery system, and the air delivery system to control a microclimate of the shelf.

In various embodiments, an enclosure is disposed about the shelf to maintain the microclimate differing from an ambient condition. The side walls may reflect light from the light source. The air delivery system may include a dry air delivery system in fluid communication with the shelf and a wet air delivery system in fluid communication with the shelf. The controller may be configured to maintain a temperature of the microclimate and a relative humidity of the microclimate. The controller may also be configured to maintain a vapor pressure deficit (VPD) of the microclimate.

DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals also denote like elements.

DETAILED DESCRIPTION

Figure 1:
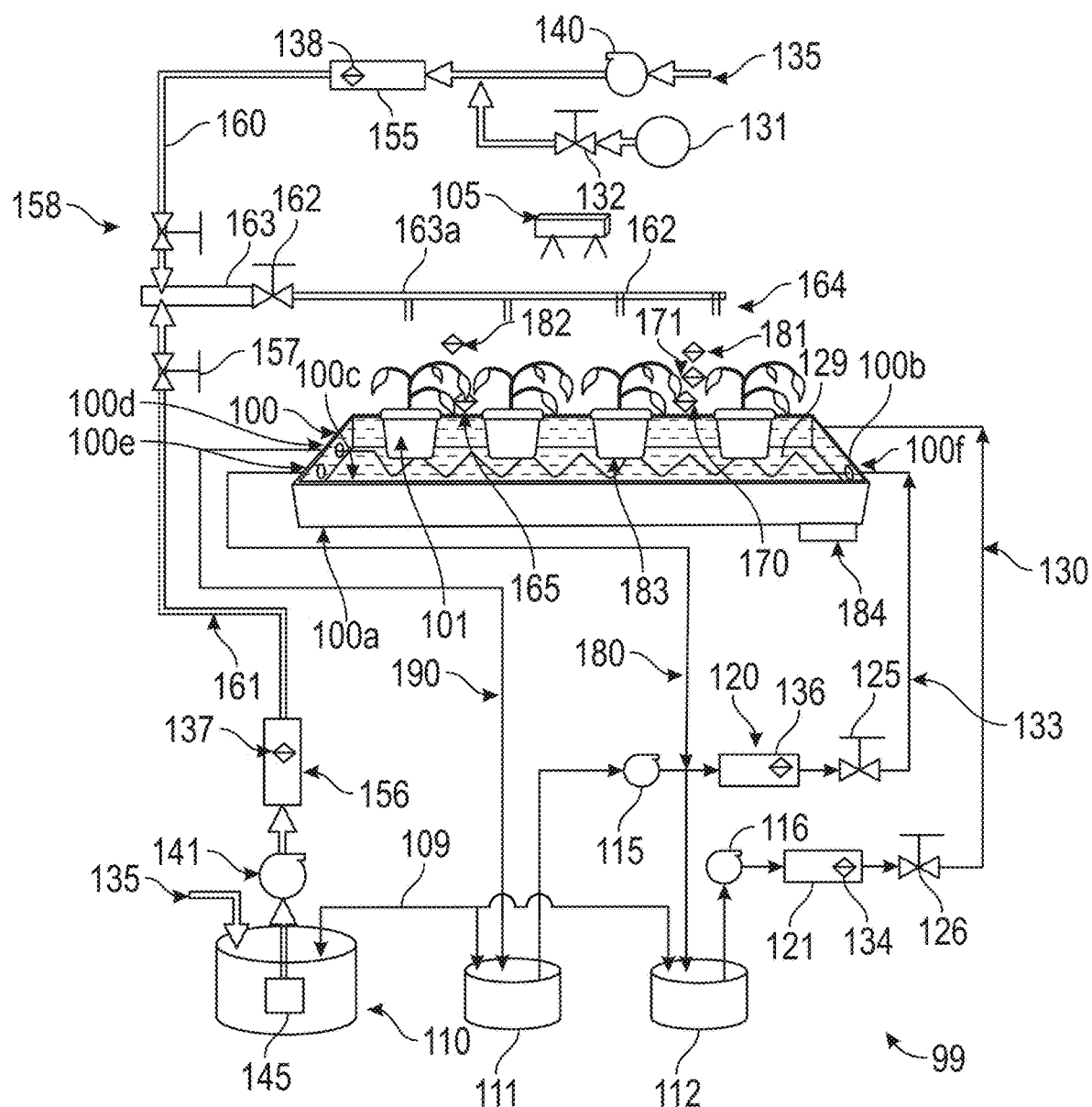
FIG. 1 illustrates a schematic view of a growing system having a single open shelf and vertical air delivery system, in accordance with various embodiments.

The detailed description of exemplary embodiments herein refers to the accompanying drawings, which show exemplary embodiments by way of illustration and their best mode. While these exemplary embodiments are described in sufficient detail to enable those skilled in the art to practice the inventions, it should be understood that other embodiments may be realized, and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, the term "microclimate" may refer to the climate at the location of a plant, unit, shelf, compartment, or other localized area. The term "macroclimate" may refer to the climate in a broader area than a microclimate such as, for example, an entire room or growth facility.

Systems, methods, and devices of the present disclosure may allow manual or electronic control of multiple environmental variables to optimize a plant-growing environment at a localized level, tending to result in optimal growth rates and outcomes. The localized level may include individual controls for individual plants. Plant growing systems may be configured to establish desired microclimate conditions and may control microclimate factors to execute growth processes tailored to specific plants, growth stages, and desired results.

In various embodiments, growing facilities may maintain environmental control. Such facilities may include computer systems or controllers to electronically control pumps configured to deliver water and air to the growing facility. Growing facilities may also include air and water heaters, light sources, humidity, and temperature sensors, weight sensors, timers, carbon dioxide sensors, light sensors, mist foggers, and fluid control valves in concert with air and water delivery lines and tubes, fasteners, or other suitable environmental control mechanisms. Growing facilities may include this one, may use basic electronic relay driven or manually controlled pumps, heaters, and control valves in concert with sensors with visual gauges or a combination thereof.

In various embodiments, the specific size and placement of pumps, operational parameters of valves, regulators, sensors, may vary depending on the size, cost, and configuration of a System. For example, a temperature sensor or fluid flow regulator may be on the inlet or outlet side of the associated pump and may be far from or near the air or water source. Similarly, in line air or water heaters, may similarly be placed on either side of the pump. Relative positions of these subcomponents as illustrated herein are not considering limiting in any way.

Figure 2:
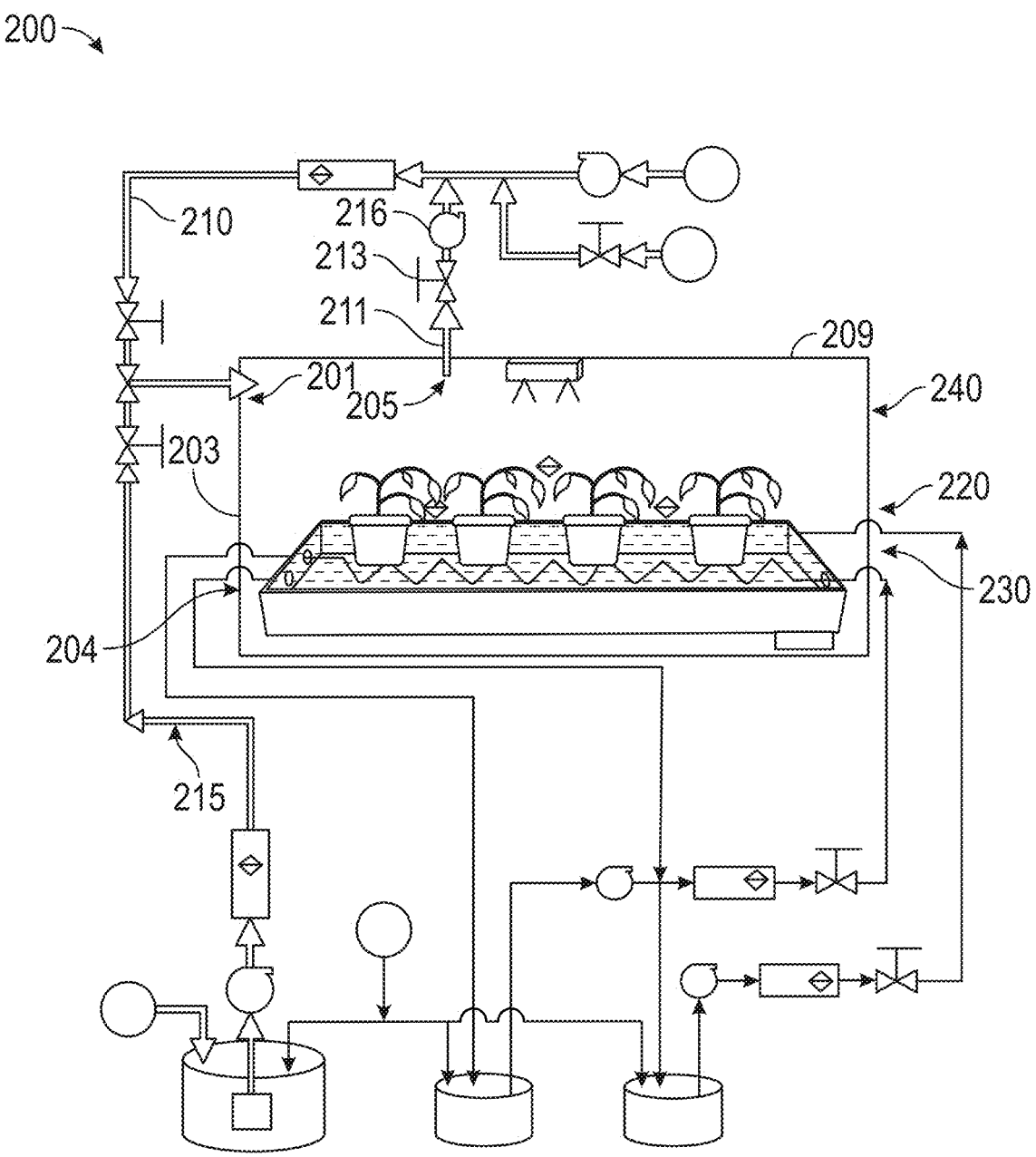
FIG. 2 illustrates a schematic view of a single enclosed shelf system and general air distribution system.
Figure 3:
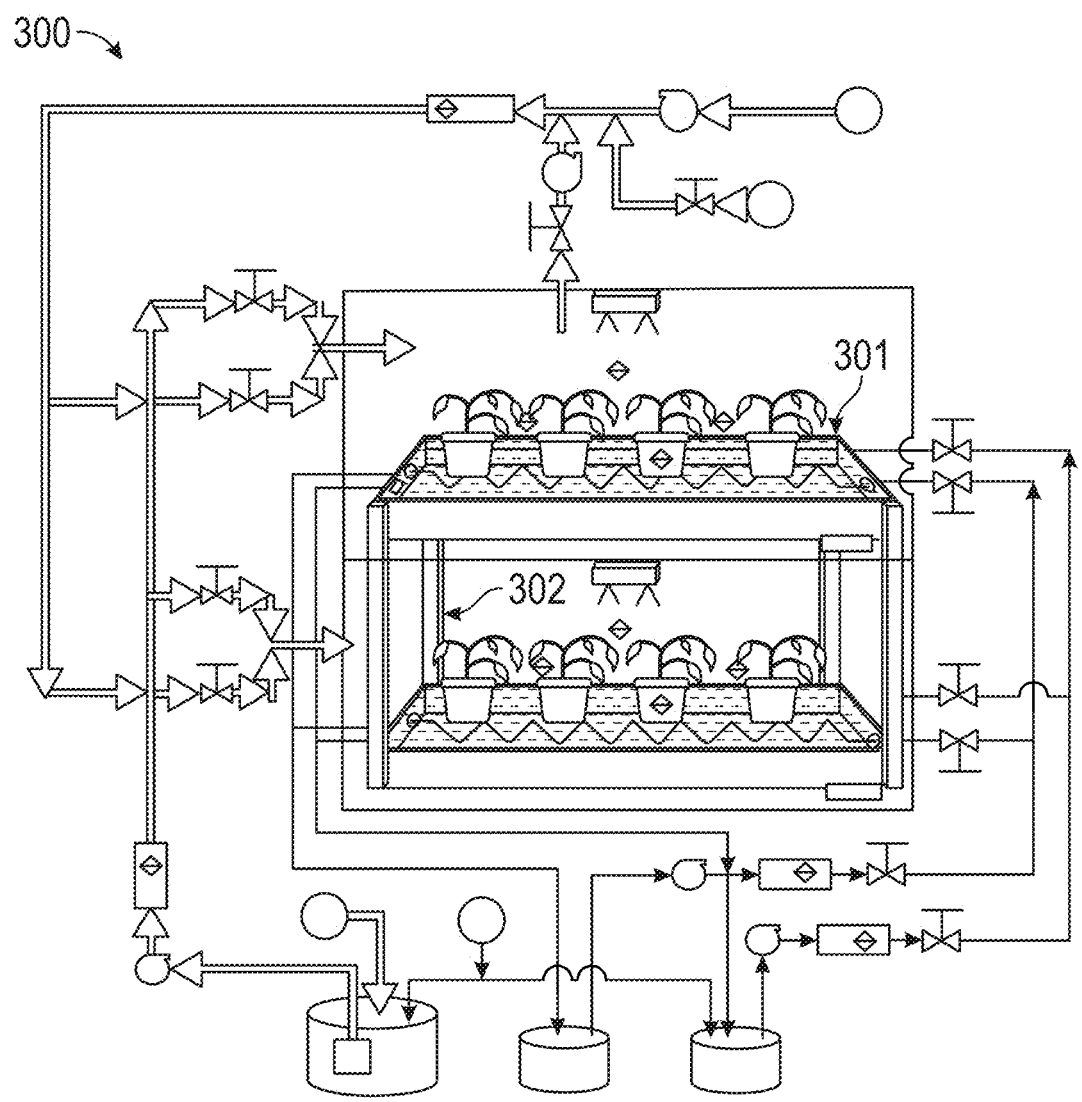
FIG. 3 illustrates a schematic view of a multiple enclosed shelf system, in according with various embodiments.

Referring to FIGS. 1, 2, and 3, sensors may be employed to measure, monitor, and transmit feedback suitable for use in controlling a microclimate to achieve desired plant growth. Sensors may be included in an electronic control system operatively connected to an electronic control system.

In various embodiments, fluid delivery systems may be a series of tubes fluid connectors coupling subcomponents 130, 133, 160, 161, 180, 190, and 211 together in fluid delivery systems.

Figure 4:
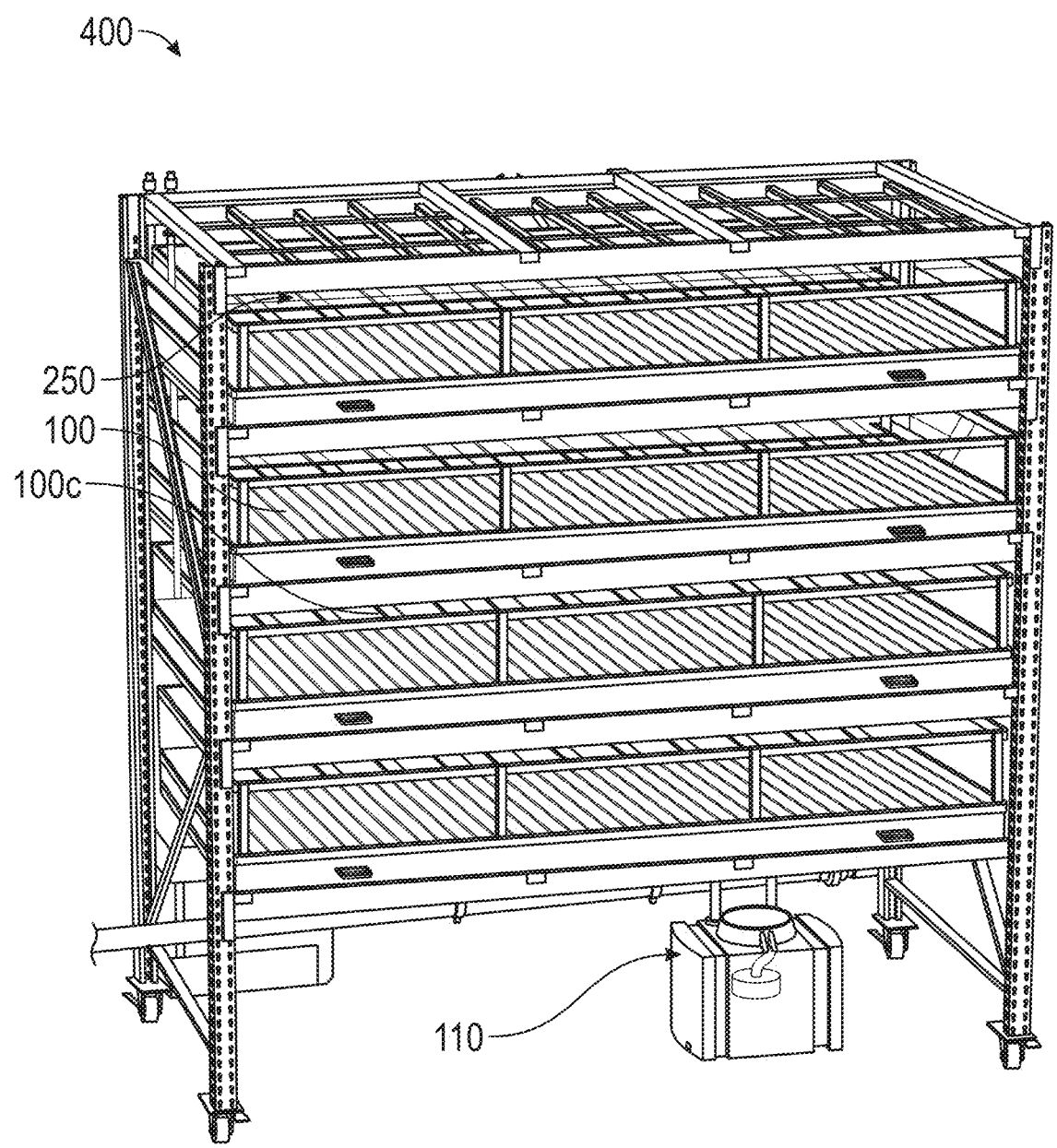
FIG. 4 illustrates a front perspective view of a growth system having transparent shelves, in accordance with various embodiments.

Referring now to FIG. 1, system 99 for growing plants is shown in schematic view, in accordance with various embodiments. System 99 for growing plants is an open, single shelf system. For comparison, system 200 of FIG. 2 depicts system 200 for growing plants in a closed, single shelf embodiment. System 300 of FIG. 3 depicts system 300 for growing plants in a closed, multi-shelved embodiment. System 400 of FIG. 4 depicts a multi-shelf system for growing plants. Features described herein with respect to systems 99, 200, 300, 400, or other embodiments may interchangeably be integrated into or omitted from various embodiments. For example, features described with reference to system 99 may be included in various embodiments of system 200, system 300, and system 400.

In various embodiments, system 99 may comprise ambient input conditions, and sources, grow shelf, air pumps/blowers, control valves, heaters, sensors, various connective air and water lines, or other suitable control systems and sensors. Ambient conditions such as macroenvironment air source 135 and macroclimate water source 109 may comprise variable inputs to a growing operation. Conditions of water and air from microclimate sources may be similar to ambient conditions at input source to the growing facility or within a growing facility.

In various embodiments, system 99 may comprise grow shelf 100 configured to support and retain growing containers 101. Growing containers 101 may contain one or more plants or biological material suitable for inciting plant growth. Grow shelf 100 may comprise horizontal member 100*a*. Grow shelf 100 may include one or more integral vertical grow shelf sides 100*b* coupled to the horizontal member 100*a* and configured to retain water. Grow shelf 100 may also comprise a horizontally positioned grate 100*c*. Grate 100*c* may be disposed within the perimeter of grow shelf 100 bounded by shelf sides 100*b*.

In various embodiments, grow shelf grate 100*c* may be coupled to the interior of the grow shelf 100 or otherwise retained above horizontal member 100*a*. Grate 100*c* may support growing containers 101 to create spacing between grate 100*c* and horizontal member 100*a*. Water may leave growing containers 101 and fall into space between grate 100*c* and horizontal member 100*a*. Space between grate 100*c* and horizontal member 100*a* may retain heat exchanger 129. Heat exchanger 129 may comprise conduit containing heated gas or fluid suitable for indirectly heating growing containers 101. Grow shelf 100 may comprise passages defined through one or more grow shelf sides 100*b* for conduit, including the heat exchanger 129, inlet 100*f*, outlet 100*e*, and irrigation drain, 100*d*. Passages through grow shelf 100 may be sealed with watertight seals, hermitic seals, or other seals tending to reduce the passage of fluid or gas.

In various embodiments, system 99 may comprise dry air delivery system 160 and carbon dioxide source 131. Carbon dioxide source 131 may be stored in a pressurized tank at a pressure suitable to inject carbon dioxide into the dry air delivery system 160. System 100 may include flow control valve 132 in fluid communication with carbon dioxide source 132 to manage the flow of carbon dioxide gas from carbon dioxide source 132. Carbon dioxide flow control valve 132 may comprise a pressure regulator or flow control valve, for example, and may be electronically or manually controlled. Flow control valve 132 may also be in fluid communication with an inlet or outlet of variable speed blower 140. Variable speed blower 140 may blow dry air. Variable speed blower 140 may receive air from macroenvironment air source 135. Sensor 171 may measure carbon dioxide concentration and may be mounted on system 100 at or near a plant canopy to measure the carbon dioxide concentration at a microenvironment.

In various embodiments, variable speed blower 140 may be coupled to the variable set point dry air heater 155 and dry air heater temperature sensor 138. Dry air heater temperature sensor 138 may be disposed on the inlet or outlet side of the variable speed blower 140. Output from the variable speed blower 140 may be in fluid communication with dry air flow control valve 158. Dry air flow control valve 158 may be capable of accepting variable set points, and may comprise a pressure regulator or flow control valve.

In various embodiments, flow control valve 132, variable speed dry air blower 140, variable set point dry air heater 155, dry air heater temperature sensor 138, grow shelf air humidity sensor 165, grow shelf air temperature sensor 170, and variable set point dry air flow control valve 158 may be electronically controlled using a control system or manually controlled to maintain a predetermined dry air temperature, flow rate, and carbon dioxide concentration. Such parameters may be controlled when gas arrives at distribution manifold 163.

In various embodiments, wet air delivery system 161 of system 99 may comprise of fog water storage container 110. Fog water storage container 110 may comprise a container configured to retain water received from water source 109 in the macroclimate. Wet air delivery system 161 may use water from fog water storage container 110 to increase the humidity of gas in wet air delivery system 161. The fog water storage container 110 may be coupled to a mist fogger 145 by a conduit suitable to deliver fluid. Mist fogger 145 may be configured to receive variable set points. Mist fogger 145 may pressurize a wet gas flow and may be manually or electronically controlled.

In various embodiments, mist fogger 145 may receive water from the fog water storage container 110 and ambient air from air source 135 in the macroclimate to generate gas supply having the desired humidity or carrying a desired amount of water. The output of mist fogger 145 may be in fluid communication with the input of the variable speed fog air blower 141. Variable speed fog air blower 141 may be in fluid communication with variable set point wet air heater 156.

In various embodiments, wet air temperature sensor 137 may be disposed at the inlet or outlet side of the variable speed fog air blower 141. Output from variable speed fog air blower 141 may be transmitted through a variable set point wet air flow control valve 157. Variable set point wet air flow control valve 157 may comprise a pressure regulator or simple flow control valve. Variable speed fog air blower 141, wet air temperature sensor 137, variable set point wet air heater 156, and variable set point dry air flow control valve 157 may be electronically or manually controlled to maintain a desired wet air flow rate, temperature, and humidity level when delivered to distribution manifolds 163.

Figure 7:
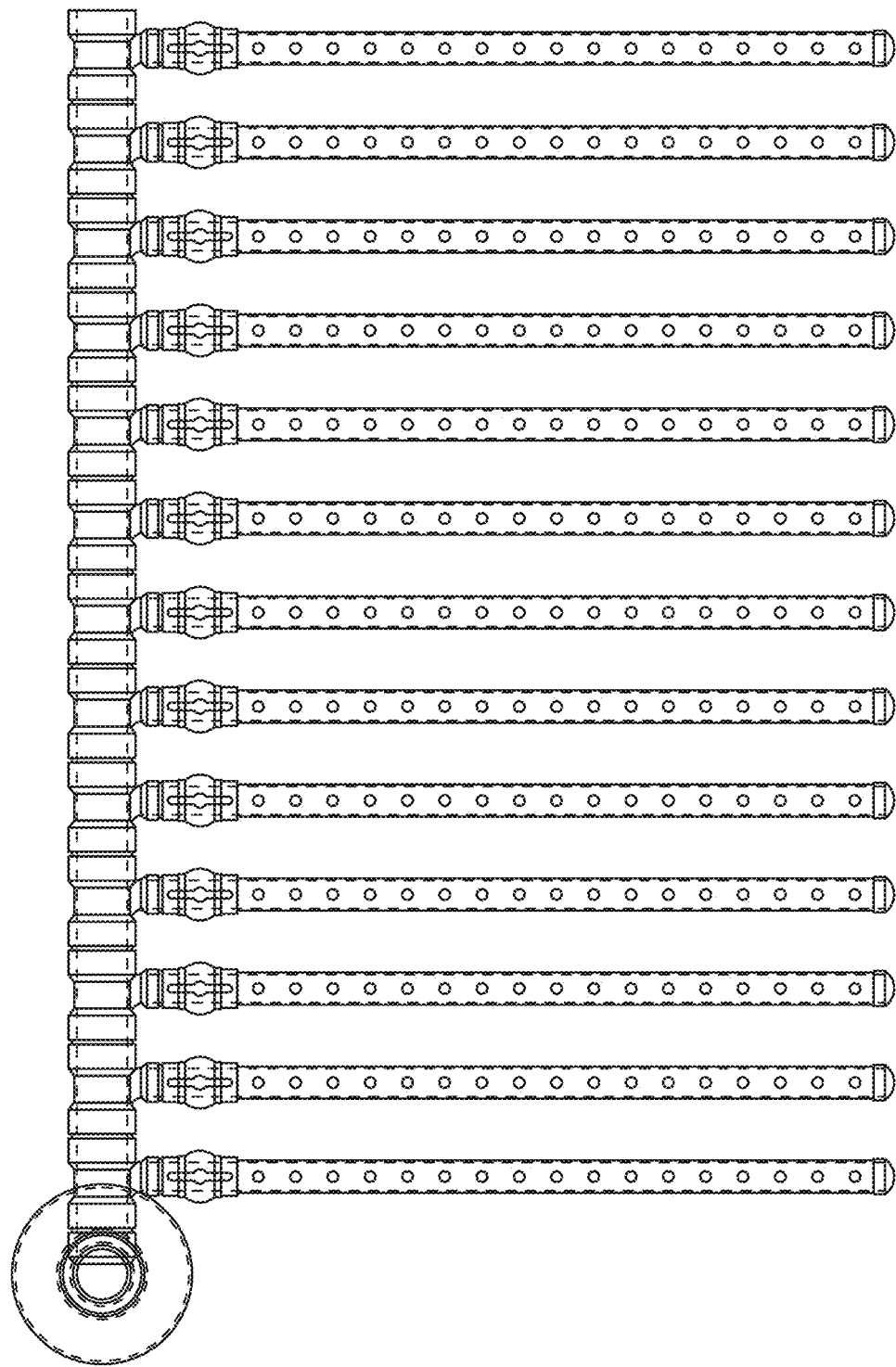
FIG. 7 illustrates an elevation view of a vertical air distribution manifold having nozzles, in accordance with various embodiments.
Figure 8:
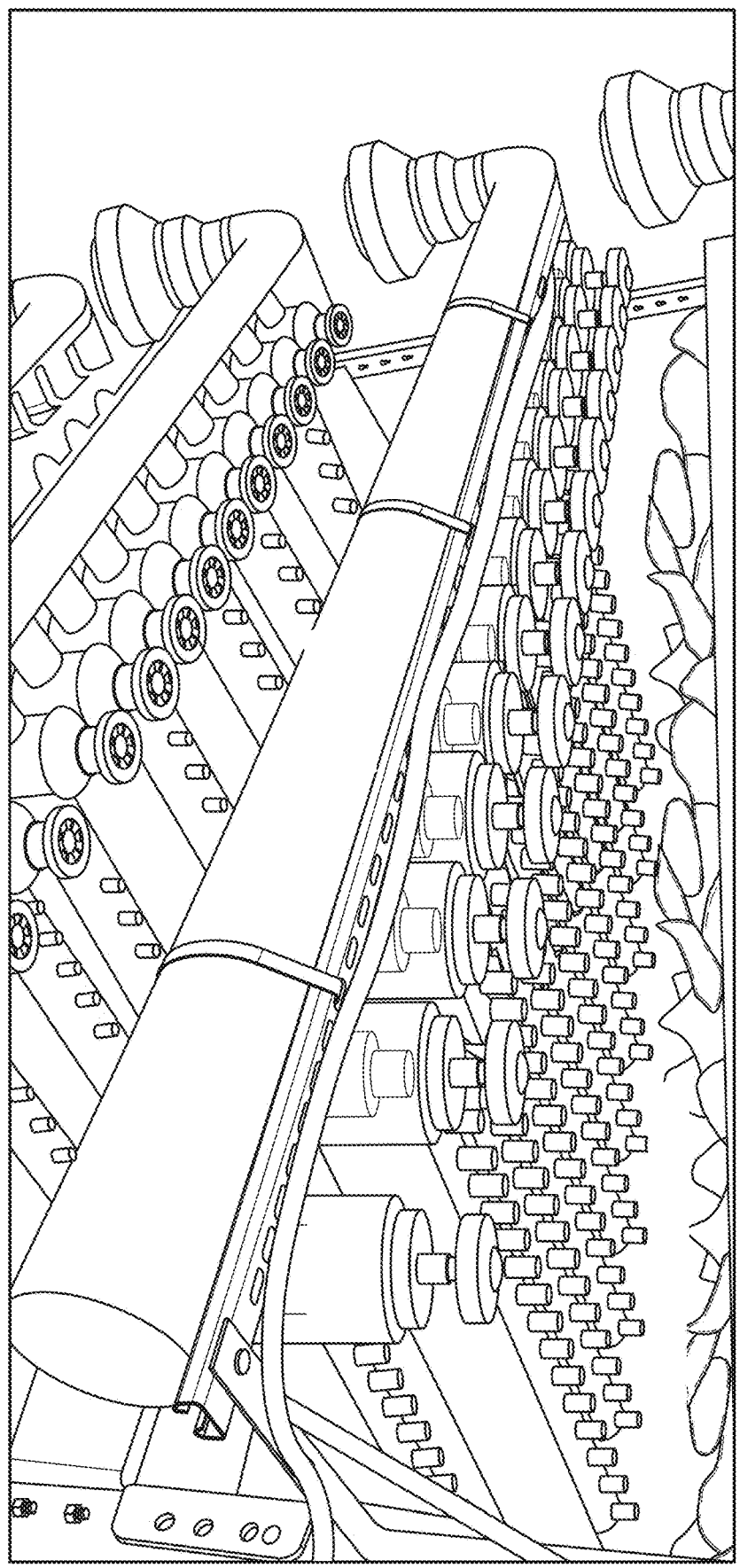
FIG. 8 illustrates a perspective view of a vertical air distribution manifold having nozzles and lighting, in accordance with various embodiments.
Figure 9:
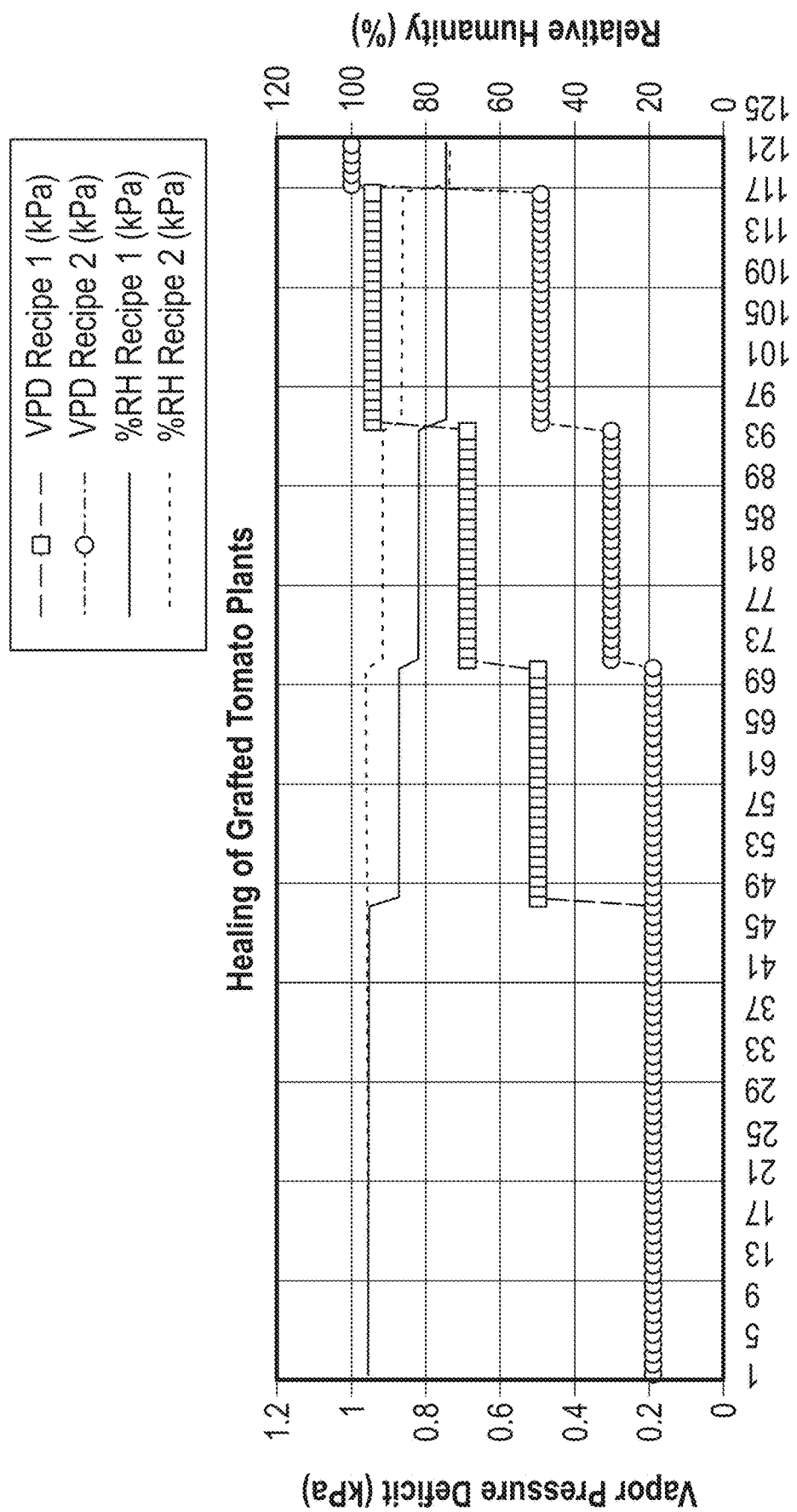
FIG. 9 illustrates a graph of VPD and relative humidity over time during healing of grafted tomato plants, in accordance with various embodiments.
Figure 10:
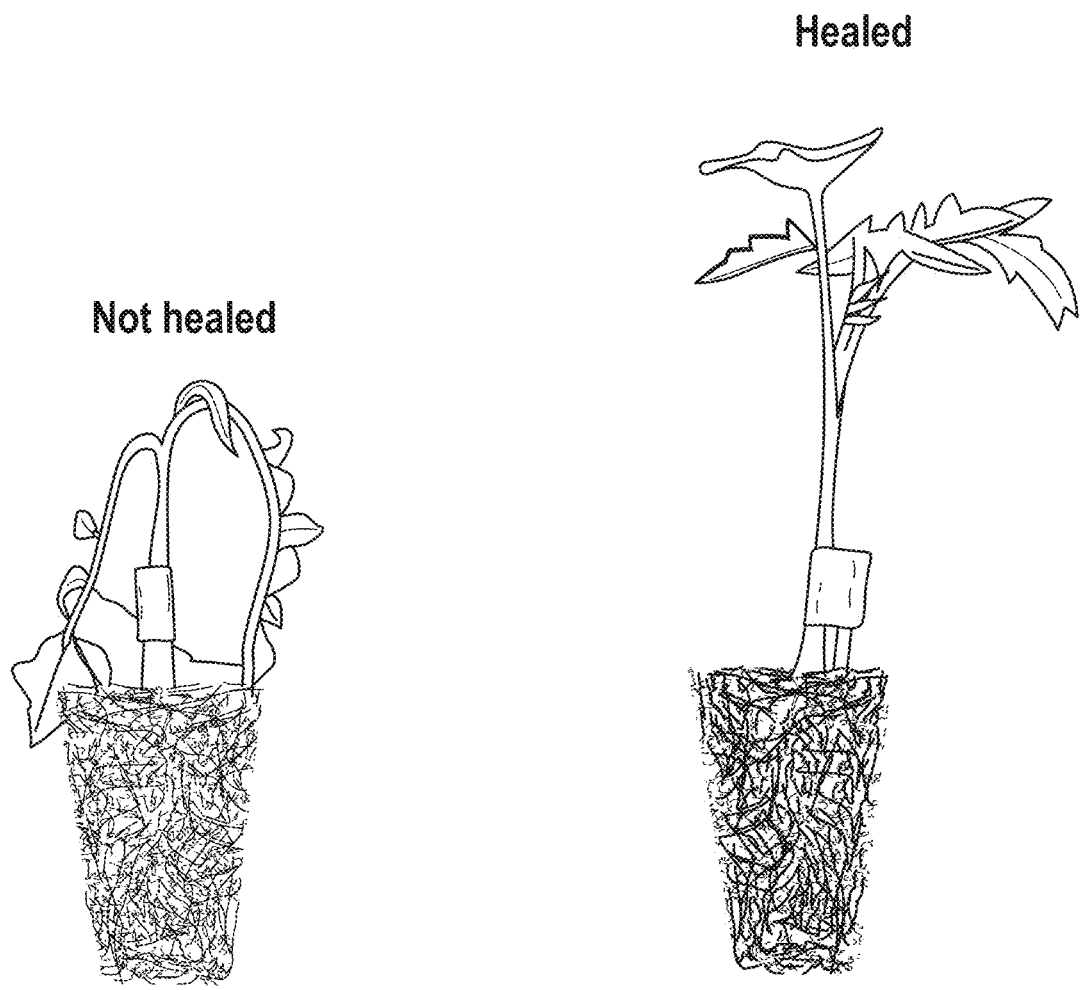
FIG. 10 illustrates a healed plant beside an unhealed plant, in accordance with various embodiments.
Figure 11:
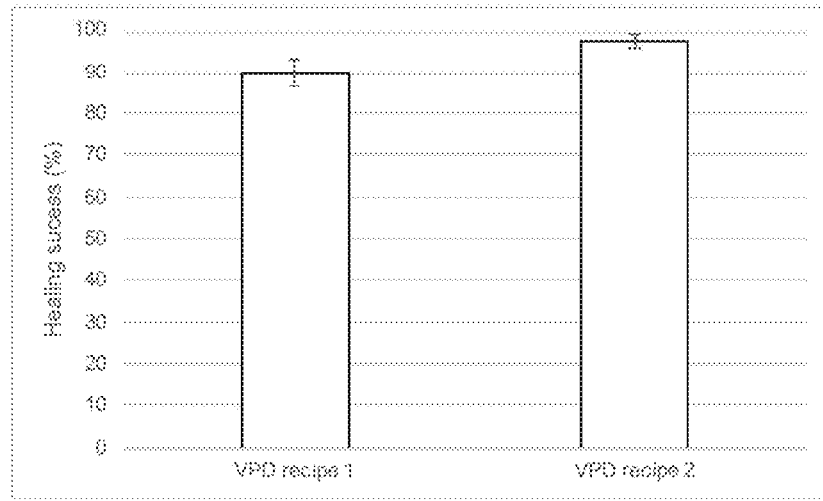
FIG. 11 illustrates a graph of relative healing success for two VPD healing recipes, in accordance with various embodiments.
Figure 12:
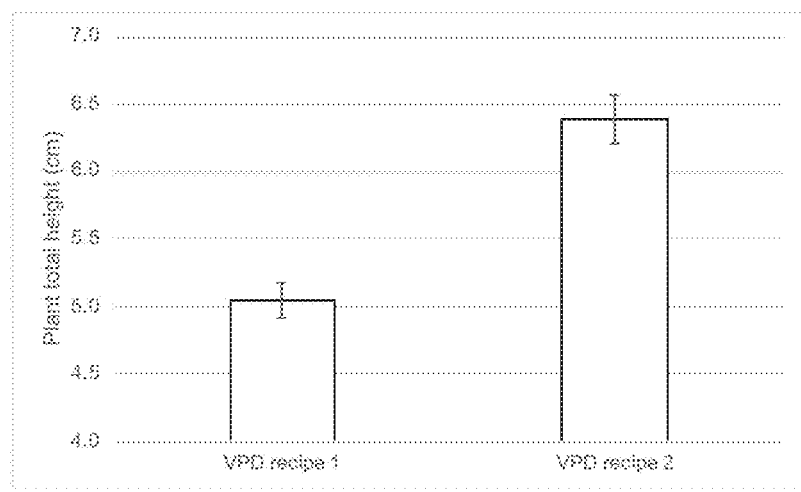
FIG. 12 illustrates a graph of plant height comparison between two VPD healing recipes, in accordance with various embodiments.
Figure 13:
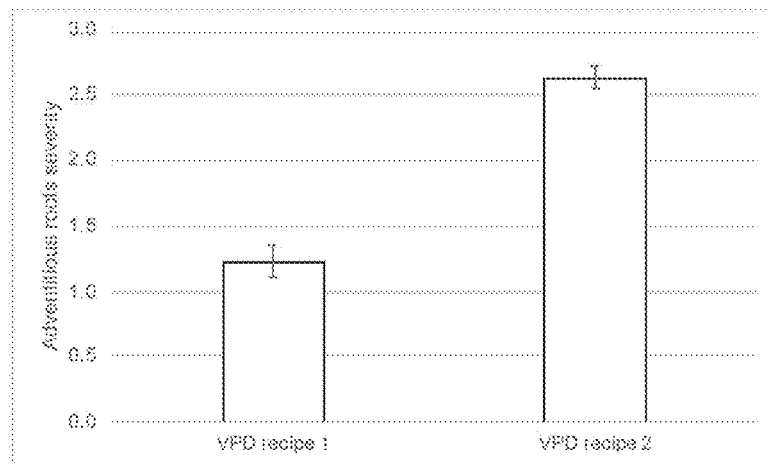
FIG. 13 illustrates a graph of the relative adventitious root severity of two VPD recipes, in accordance with various embodiments.
Figure 14:
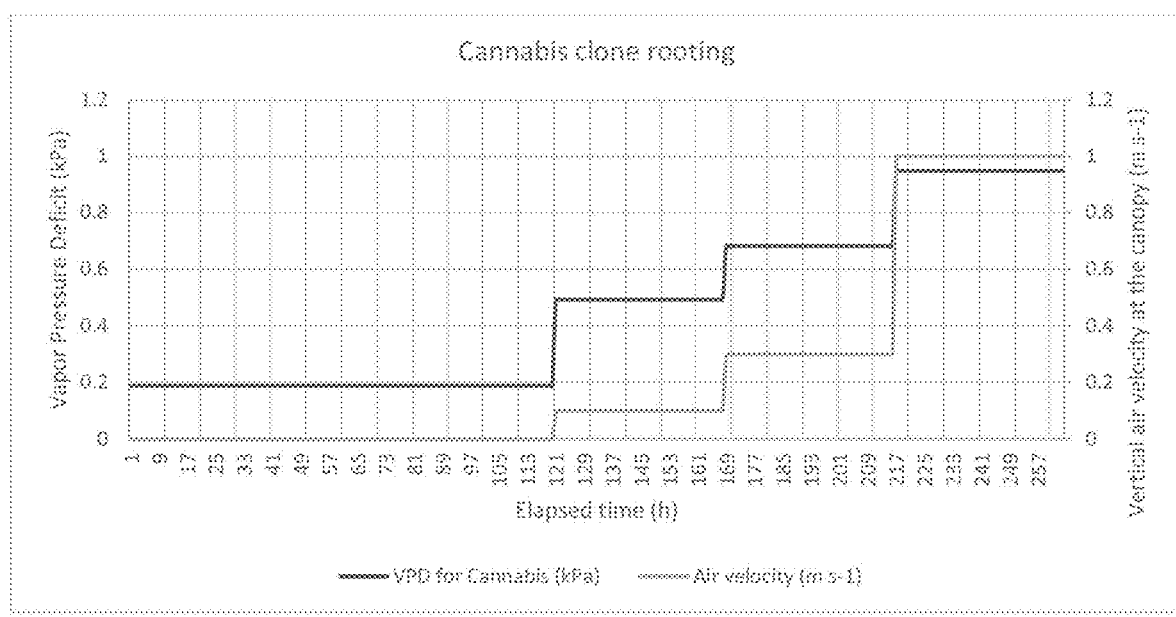
FIG. 14 illustrates a graph of vapor pressure deficit and air velocity over time during clone rooting, in accordance with various embodiments.

In various embodiments, with continued reference to FIG. 1 and further reference to FIG. 7 and FIG. 8, distribution manifold 163 may be a sealed container fluidly and functionally connected to the output of the variable set point dry air flow control valve 158 and the output of the variable set point wet air flow control valve 157. The distribution manifold 163 may be configured to receive and mix the output of the dry air delivery system 160 and wet air delivery system 161. Distribution manifold 163 may be disposed proximate to one edge of each grow shelf 100 of system 99. Distribution manifold 163 may extend over each grow shelf 100 at a height greater than or equal to the maximum height of the plants to be grown in growing containers 101.

In various embodiments, distribution manifold 163 may have approximately the same length as grow shelf 100. Distribution manifold 163 may comprise a volume suitable to provide mixed air into conduits, nozzles, and other fluid delivery components in fluid communication with distribution manifold 163. Distribution manifold 163 may be coupled to a plurality of vertical air distribution variable rate flow control valves 162 along its axis. Vertical air distribution variable rate flow control valves 162 may be disposed proximate each row of plant growing containers 101. Vertical air distribution variable rate flow control valves 162 may comprise pressure regulators or flow control valves. Vertical air distribution variable rate flow control valves 162 may be electronically or manually controlled to regulate air flow or air velocity at a predetermined level. The output side of each vertical air distribution variable rate flow control valve 162 may be coupled to and in fluid communication with air distribution pipe 163*a*.

In various embodiments, air distribution pipe 163 may be configured to receive mixed air from the vertical air distribution variable rate flow control valve 162. Air distribution pipe 163 may be disposed above growing containers 101. Each air distribution pipe 163*a* may include multiple vertical air distribution nozzles 164 sized and oriented to deliver a predetermined amount of gas to each plant. The gas may be delivered in a downward direction towards growing containers 101 and grow shelf 100. Gas may flow generally downward into the plant canopy as best shown in FIG. 8. Air distribution pipes 163*a* may provide gas having a desired mixture with a predetermined temperature, humidity, carbon dioxide level, flow rate, or velocity.

In various embodiments, conditions in the canopy of each grow shelf 100 may be measured by a grow shelf air temperature sensor 170, grow shelf air humidity sensor 165, grow shelf carbon dioxide sensor 171, grow shelf air velocity sensor 181. Such sensors may be in electronic communication with a control system configured for automated or manual control.

In various embodiments, system 99 may include root temperature control system loop comprising warm water delivery system 133. A root temperature control system loop may comprise water storage container 111. Water storage container 111 may be a configured to hold water received from water source 109. Water storage container 111 may deliver warm water to grow shelf heat exchanger 129. Water storage container 111 may be in fluid communication with water pump 115 at the inlet side. Water pump 115 may comprise a variable speed pump. Water pump 115 may receive water from the water storage container 111.

In various embodiments, an outlet side of heat exchanger water pump 115 may be in fluid communication with heat exchanger water heater 120 and temperature sensor 136. Water heater 120 may be capable of operating with variable set points. Temperature sensor may detect the temperature of water in a heat exchanger. Heat exchanger water heater 120 and temperature sensor 136 may be disposed at the inlet or outlet side of the heat exchanger water pump 115, which may operate at variable speeds or at a single speed. Outlet of heat exchanger water heater 120 may be coupled to heat exchanger water temperature sensor 136 and variable set point water flow regulator 125. Variable set point water flow regulator 125 may comprise a pressure regulator or flow control valve.

In various embodiments, the output of the variable set point water flow regulator 125 may be in fluid communication with grow shelf heat exchanger 129. The output of variable set point water flow regulator 125 may flow through heat exchanger water delivery system 133. Grow shelf heat exchanger 129 may be coupled to horizontal member 100a of grow shelf 100. Grow shelf heat exchanger 129 may be disposed between grow shelf grate 100c and horizontal member 100a.

In various embodiments, grow shelf heat exchanger 129 may transfer energy from warm water flowing through the heat exchanger water delivery system 133 and grow shelf heat exchanger 129 to the irrigation water, soil, or substrate retained in or on grow shelf 100. Substrate temperature sensor 183 may be mounted below the surface of the substrate within growing container 101 to measure the temperature of the plant's substrate and provide feedback to an electronic or manual control system.

In various embodiments, the root temperature control loop may be activated by providing power to heat exchanger water pump 115. Heat exchanger water pump 115 may operate at variable speeds or a single speed. Fluid in the root temperature may be heated by water heater 120, which may be in fluid communication with the heating circuit of the root temperature control loop. Heat exchanger water temperature sensor 136 may detect water or fluid temperatures, and flow may be controlled by water flow regulator 125. Water flow regulator 125 may be capable of operating with multiple set points.

In various embodiments, a desired root temperature set point may be entered into system 99. The temperature may be achieved by adapting the various features described herein to maintain a predetermined temperature as detected at substrate temperature sensor 183. For example, closed loop control systems or manual adjustments may adapt operation the variable speed heat exchanger water pump 115, heat exchanger water heater, 120, and variable set point water flow regulator 125. Substrate temperature sensor may transmit feedback to the control system in the form of a temperature. The control system may adjust the heat exchanger fluid temperature, flow rates, or other characteristics to maintain the desired temperature at temperature sensor 183. Variable set point heat exchanger water pump 115, heat exchanger water heater 120, heat exchanger water temperature sensor 136, and variable set point water flow regulator 125 may be electronically or manually controlled to achieve a specific water temperature and plant outcome. System 99 may utilize a variety of heat exchanger fluids in the root temperature control loop.

In various embodiments, system 99 may include an irrigation water delivery system. The irrigation water deliver system may comprise of an irrigation water storage container 112 configured to hold water or nutrient solution. Irrigation water storage container may fill with water from water source 109. The irrigation water delivery system may deliver water to the interior of the grow shelf 100. The irrigation water storage container 112 may be in fluid communication with irrigation water pump 116 at the inlet side. Irrigation water pump 116 may receive water from water storage container 112. The outlet side of variable speed irrigation water pump 116 may be in fluid communication with irrigation water heater 121 and irrigation water temperature sensor 134. The variable set point irrigation water heater 121 and irrigation water temperature sensor 134 may be disposed at the inlet or outlet side of the variable speed irrigation water pump 115. Output from the irrigation water heater 121 may be in fluid communication with irrigation water temperature sensor 134 and water flow regulator 126. The flow regulator 126 may be comprise a pressure regulator or flow control valve, for example.

In various embodiments, output from flow regulator, 126 may pass through irrigation water delivery system 130 towards grow shelf 100. In that regard, output from flow regulator 126 may deliver irrigation water on demand to the interior of the grow shelf 100. Excess irrigation water from grow shelf 100 may drain through drain 100d, through the irrigation water drain system 190, and into the irrigation water storage container 112.

In various embodiments, irrigation water pump 116, irrigation water heater 121, irrigation water temperature sensor 134, weight sensor 184, and variable set point water flow regulator 126 may be electronically or manually controlled. The on-state or operating time and throughput of the irrigation water delivery system 130 may be tailored to deliver a desired volume of water. Weight sensor 184 may measure the weight of a grow shelf 100. Weight sensor 184 may transmit weights to a control system that may determine a difference between a starting weight and a desired ending weight that reflects the desired amount of water delivered to grow shelf 100. The control system may also measure the flow rate and run the irrigation system for period of time suitable for delivering the desired amount of water.

In various embodiments, light source 105 generates light spectrums suitable to support plant growth. Light source 105 may be capable of delivering light having preset or variable wavelengths. Light source 105 may be mounted above the grow shelf 100 to deliver light to plants in growing containers 101. Light source 105 may be electronically controlled by a computer-based control system. Light source 105 may be in electronic communication with such computer control system to generate light within parameters set by such computer system.

In various embodiments, humidity sensor 165 may be mounted within or above the plant canopy to measure the microclimate humidity in or around grow shelf 100. Air temperature sensor 170 may be mounted within or above the plant canopy to measure the microclimate air temperature in or around grow shelf 100. Light sensor 182 may be operatively mounted within or above the plant canopy to measure the microclimate light spectrum, intensity, and uptime in or around grow shelf 100. Air velocity sensor 181 may be operatively mounted within or above the plant canopy to measure the microclimate air velocity in or around grow shelf 100. Weight sensor 184 may be operatively mounted to grow shelf 100 and configured to measure the weight of grow shelf 100. Change in weight may be used by the control system to indirectly measure water absorption, irrigation needs, and plant growth.

Referring now to FIG. 2, system 200 for growing plants is shown having an enclosed shelf and air distribution. System 200 may comprise shelf enclosure 209. Shelf enclosure 209 may enclose a microclimate and tend to increase isolation from ambient conditions relative to an open system. Shelf enclosure 209 may be comprise canvas or other material disposed around the grow shelf. Shelf enclosure 209 may comprise structure sufficient to retain a volume suitable to grow plants. Shelf enclosure 209 may retain air and water delivery systems, electrical lines. Shelf enclosure 209 may be transparent, translucent, or may otherwise permit electromagnetic radiation transmission into the enclosed volume. Shelf enclosure 209 be shaped to accommodate the grow shelf 100 plant growing containers 101 and the various microclimate controls and sensors mentioned herein. The shelf enclosure 209 comprise have one or more internally light reflective sides 250, as shown in FIG. 4. Shelf enclosure 209 may include a resealable and detachable side to facilitate access to grow shelf 100 without removing the entire enclosure 209.

In various embodiments, shelf enclosure 209 may include openings to allow conduit to pass to the interior of shelf enclosure 209. Openings defined by enclosure 209 may tend to seal limit or restrict passage of air or water into or out of the macroclimate. Openings defined by shelf enclosure 209 may comprise sealable configured passages configured to engage irrigation water delivery 220, heat exchanger water delivery 230, return 203, irrigation water excess drain 204, and air re-circulation loop 205.

In various embodiments, shelf enclosure 209 may define opening 201 to mixed dry and wet air for delivery through shelf enclosure 209. Shelf enclosure 209 may define an exhaust opening 240. Opening 201 and exhaust opening 240 may comprise flow controls to limit restrict or control movement of air or other fluids into or out of shelf enclosure 209. Shelf enclosure 209 may house all or part of air distribution manifold 163, the vertical air distribution delivery system, vertical air distribution pipe 164, and associated couplings and components.

In various embodiments, system 99 may include a recirculation loop air system that receives air from within the shelf enclosure 209 through recirculation loop air delivery system 211. Recirculation loop air delivery system 211 may pass through enclosure opening 205. Recirculation loop air blower 216 may entrain air into the recirculation loop air delivery system and through control valve 213. Recirculation loop air blower 216 and recirculation loop air control valve 213 may tend to improve the efficiency of system 200 through the reuse of conditioned air rather than ejecting conditioned air.

Referring now to FIG. 3, system 300 for growing plants is shown, in accordance with various embodiments. System 300 may comprise multiple enclosed grow shelves 301 and an air distribution system 300. Shelf enclosure 209 may surround and enclose any number of grow shelves 301. Additional shelves 301 may be coupled together by a standoff or a vertical member 302. Each grow shelf 301 may be enclosed separate from adjacent grow shelves 301. Each shelf may be enclosed in a compartment having the same passages suitable for microclimate controls and sensors to operate and control the climate within the compartment. In that regard, each shelf 301 may be enclosed in its own microclimate.

Figure 5:
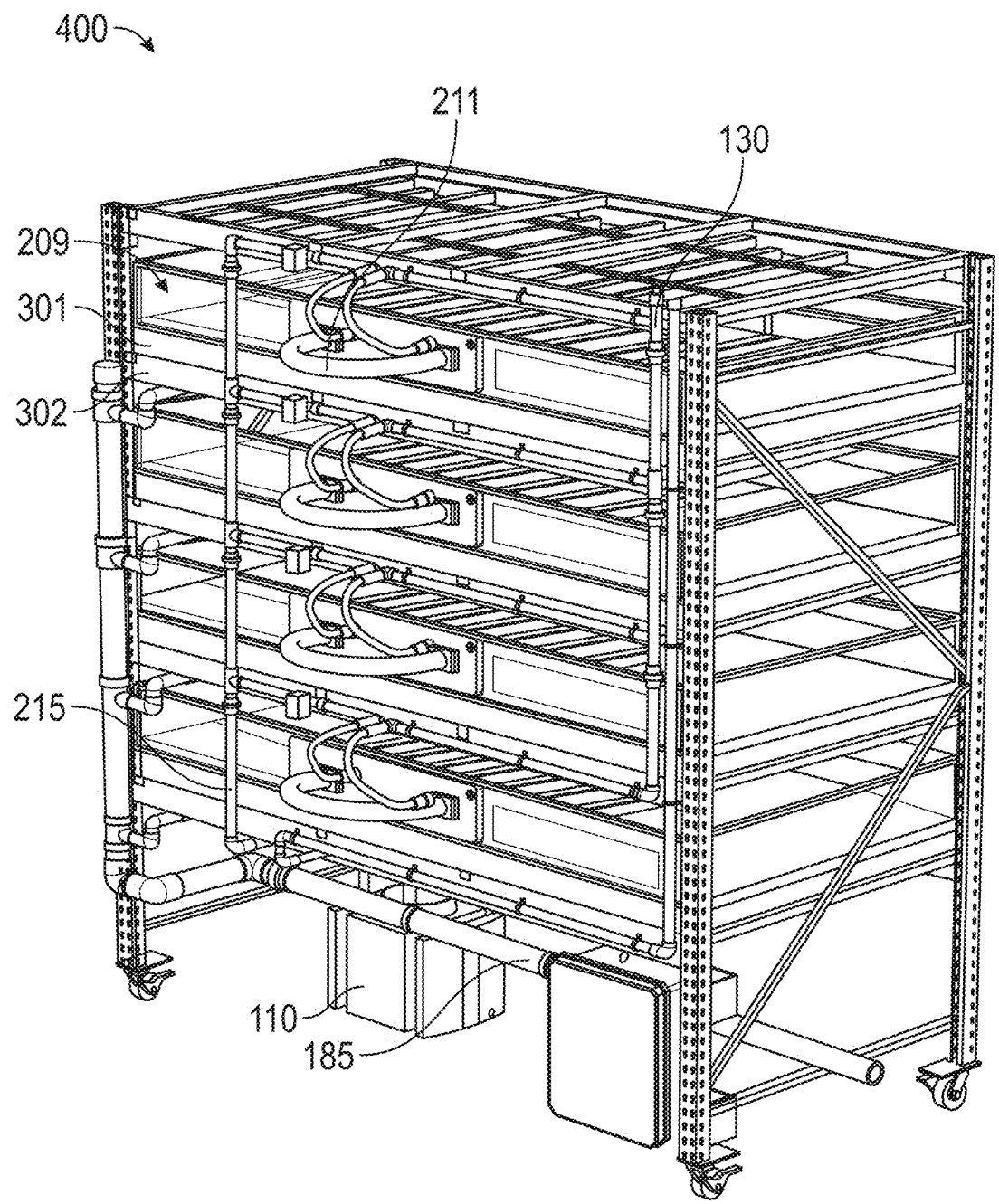
FIG. 5 illustrates a rear perspective view of a growth system having air and water control systems, in accordance with various embodiments.
Figure 6:
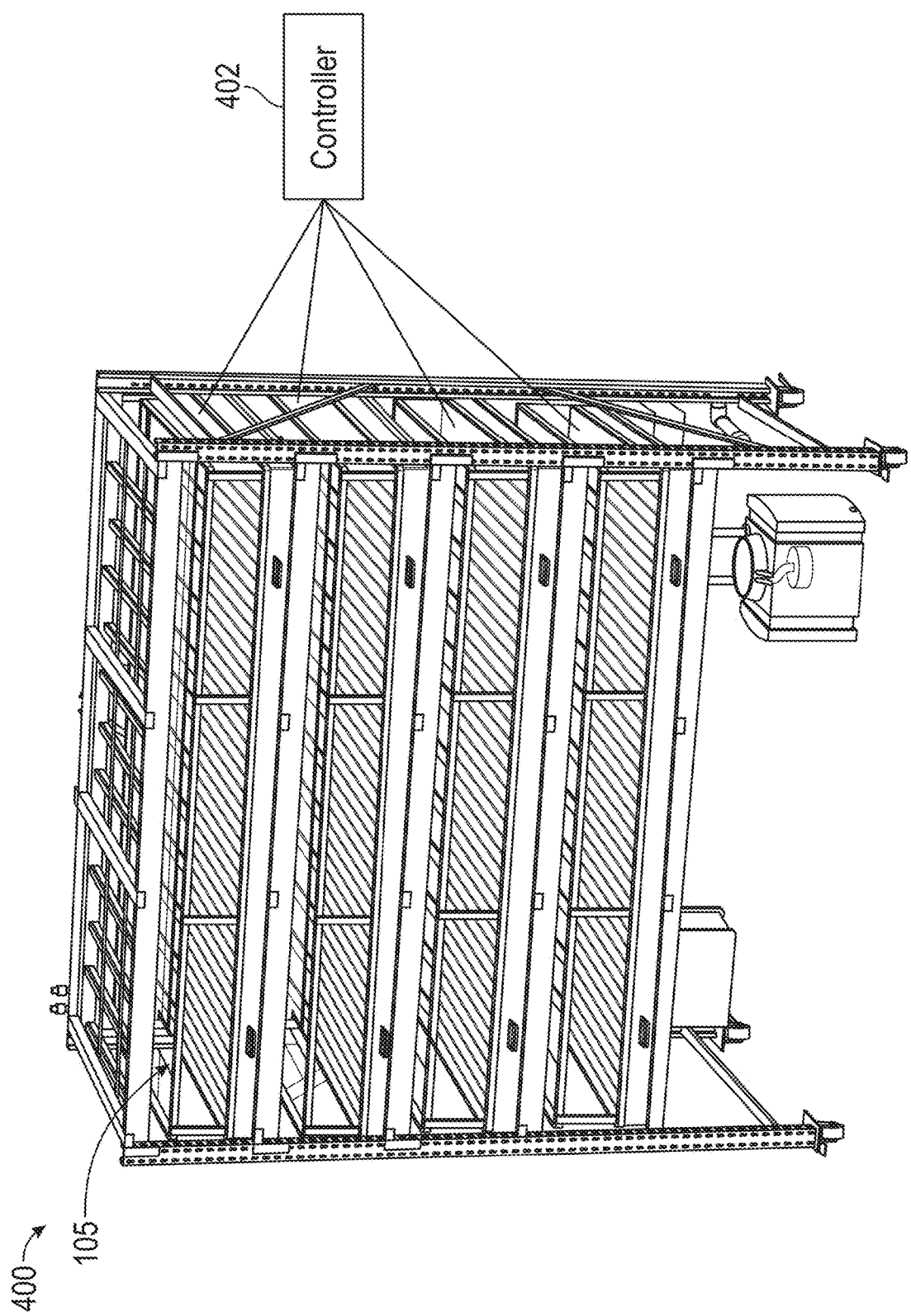
FIG. 6 illustrates a front perspective view of a growing system having light sources, in accordance with various embodiments.

With reference to FIGS. 4, 5, and 6, system 400 is shown having multiple shelves 100 with shelf grates 100c, interior reflective sides, irrigation water storage container 112, irrigation water delivery system 130, fog water storage container 110, wet air delivery system 161, dry air distribution system 160, and light sources 105 as described above. Shelves 100 if system 400 may be enclosed with an enclosure 209 as shown and described in FIGS. 2 and 3.

In various embodiments, controller 402 may be in electronic communication with sensors, pumps, valves, light sources, and switches for each shelf 100. Controller 402 may control the microclimate for each shelf 100 of system 400 independently of other shelves. In that regard, system 400 may maintain a different microclimate on each shelf 100 based on parameters input into controller 402. Controller 402 may enable manual control or calibration. Controller 402 may automatically control the microclimate for each shelf 100 in response to a recipe input into controller 402.

In various embodiments, controller 402 of system 400 may be computer-based. Controller 402 may be a server, controller, a personal computer, a terminal, a workstation, a portable computer, a mobile device, a tablet, a mainframe, other suitable computing devices either operating alone or in concert. System 400 may include a plurality of computing devices connected through a computer network, which may include the Internet, an intranet, a virtual private network (VPN), a local area network (LAN), or the like. A cloud, hardware, or software system may be implemented to execute one or more components of the system 400.

In various embodiments, controller 402 may comprise computing hardware capable of executing software instructions through at least one processing unit. Controller 402 may read measurements from temperature sensors, humidity sensors, weight sensors, light sensors, or other electronic sensors monitoring microclimate conditions for each shelf 100. Controller 402 may be programmed to maintain certain environmental conditions in each shelf 100 at various times. Controller 402 may actuate switches, select set points, and control delivery of gaseous mixtures (e.g., air), liquid mixtures (e.g., water), and various electromagnetic waves of various wavelengths and intensity (e.g., light).

In various embodiments, controller 402 may use techniques or structures described herein to control microclimates. In that regard, controller 402 may maintain different microclimates on adjacent shelves in the same rack. Controller may accept recipes having various parameters. Examples of suitable parameters and recipes are shown in tables 1 through 4 below.

In various embodiments, the management of vapor pressure deficit (VPD) through the accurate management of humidity and temperature may tend to improve plant growth. VPD may be the difference between saturation vapor pressure of the plant minus the actual air vapor pressure at a given relative humidity and temperature. Both saturation vapor pressure and actual vapor pressure can be calculated using temperature (T), relative humidity (RH), and psychometric principles. VPD is a good predictor for evapotranspiration rates. Furthermore, the increase of VPD increases plant transpiration linearly, and since plant transpiration is directly correlate to net photosynthetic rate, VPD is a good predictor for plant growth. Most importantly, to use VPD to optimize plant growth, plant temperature and canopy relative humidity (microclimate) needs to use for VPD calculations and optimization. In addition, VPD requirements for optimization are species, goal, and crop stage specific.

In various embodiments, Systems of the present disclosure may provide the ability to control VP of the air at a spatial and temporal level on a per shelf basis at the plant canopy. In that regard, systems of the present disclosure may maintain a microclimate at the shelf level to influence the VPD between the plant and surrounding air.

For example, Systems of the present disclosure may temporally control VPD from about 0.189 kPa VPD (~95% RH, 28° C.) to about 1.89 kPa VPD (~60% RH, 28° C.) in a matter of minutes. In another example, the present disclosure may control air movement at the canopy level with the ability to control vertical air velocity from about 0.0 to about 3.0 m/s at the top of the plant.

In various embodiments, VPD driven transpiration may be affected by several resistances. These resistances include leaf boundary layer and stomatal resistances, and both reduce the rate of transpiration (water vapor leaving the plant) and the rate of $CO_2$ diffusion into the plant. In other words, the greater the resistances the lower the transpiration rate and $CO_2$ diffusion and consequently a reduction in yield. Leaf boundary layer is a bubble of still air surrounding the leaf. Under low air movement, the leaf boundary layer is greater and increases the resistance to transpiration and $CO_2$ diffusion. Optimal air velocity and vertical air movement at the canopy is known to reduce boundary layer and increase transpiration and yield. Low transpiration rate at the canopy is also known to affect plant nutritional status such as calcium deficiency in the growing point (lettuce). Calcium deficiency in lettuce is caused by the thick leaf boundary layer and poor transpiration at growing tip leading to the "tip-burn", a common issue in vertical farms. Vertical air flow is known to reduce the "tip-burn" incidence.

In various embodiments, Systems of the present disclosure may control vertical air velocities at the canopy level at a spatial and temporal level, on a per row and shelf basis, at the plant canopy microclimate. Systems of the present disclosure may thus influence the VPD between the plant and surrounding air, thereby reducing leaf boundary layer resistance, increasing transpiration rate, and yield.

In various embodiments, photosynthesis may be governed using light energy, carbon dioxide, and water to produce carbohydrates in the form of photo-assimilates. However, photosynthesis is mainly measured and quantified by diffusion of $CO_2$ gas from the air to the chloroplast. This diffusion is driven by several factors including the difference in concentration between the air and stomatal cavity. The greater the difference, the greater the diffusion, and therefore the greater the photosynthetic rate. Therefore, $CO_2$ enrichment is known as a sound practice to increase photosynthesis and growth. However, the diffusion into the plant is reduced under low VPD levels and by the leaf boundary layer resistance.

In various embodiments, Systems of the present disclosure may provide for a 3-tier approach to increase the diffusion of $CO_2$ into the plant: 1) actively providing the microclimate with $CO_2$ enriched air; 2) managing VPD (RH and T) at the microclimate to increase transpiration and $CO_2$ diffusion into the plant; 3) reducing leaf boundary layer resistance in the microclimate to decrease the resistance of $CO_2$ diffusion into the plant.

In various embodiments, plant temperature is composed of shoot and root temperature, and both may be optimized to increase yield and outcome. The increase in temperature is linearly correlated to plant photosynthesis, growth, and development (flowering). These responses increase with the increase of temperature until reaching a threshold. The range of temperature (minimal and maximal temperatures) are species specific for both shoot and root temperature. Many plants physiological responses are affected by plant temperature (growth rate, flowering, germination, healing, rooting) and the accurate control at the microclimate may tend to increase output.

In various embodiments, Systems of the present disclosure may independently control shoot temperature and root temperature at the microclimate level and can maintain different optimal set points per shelf level.

In various embodiments, water availability through irrigation may tend to improve plant growth and health. High moisture level conditions in the substrate can create anaerobic conditions reducing root growth and development, while low moisture content can reduce plant growth through water stress. Optimal moisture content at the substrate will lead to optimal shoot and root growth. In addition, the accurate management of moisture content in the substrate can allow for growers to steer plant growth, morphology, and development.

In various embodiments, Systems of the present disclosure may use weight as a parameter for irrigation. Based on direct correlation between substrate weight and moisture content, the current disclosure allows for accurate and programmable irrigation rates based on derived substrate moisture content.

In various embodiments, plant growth may correlate to daily light integral (DLI) (light intensity) and typically one percent increase in DLI equals to one percent increase in yield. In addition, light intensity requirements can vary depending on the plant growth stage. For example, germination, rooting, healing require lower light intensity than growing and acclimatization. Furthermore, light spectra affects plants through photomorphogenic responses. Spectra can serve as signals to change plant morphology, development, and growth.

In various embodiments, Systems of the present disclosure may use different light levels and spectrums for specific crops, plant stage, and morphologies. The system may capitalize from light intensity and spectral recipes to support for almost any light intensity levels and almost any light spectra combinations.

In various embodiments, systems of the present disclosure comprise various systems that perform various methods to optimize plant growth outcomes, including optimizing grafted plant healing success, through control of the microclimate. The controlled microclimate tends to improve growth of auxiliary roots and plant height. Two environmental processes carried out based on vapor pressure deficit control are described below using tomatoes.

In various embodiments, the present disclosure demonstrates that when producing grafted tomato plants, for example, during the pre-grafting stage plants need a temperature of about 22° C. and a RH of 60%. During the post grafting healing stage plants need a 28° C. and 95+% RH for the first 2 days followed by a steady decrease of humidity to about 90%, 87%, 82%, 75% while maintaining about 28° C. for the next 4 days. Observations are captured in the graphs and images of FIGS. 9 through 13.

Test Results

Tables 1 & 2 describe two different recipes or processes used for healing of grafted tomato plants in lab conditions by dynamically controlling VPD and RH. Temperature, light intensity, spectrum, vertical air velocity and $CO_2$ were accurately maintained by the system at about 28° C., about 85 µmol m−2 s−1, about 40 Blue:60 Red, about 0.3 m s−1, and about 400 µmol mol−1, respectively.

TABLE 1

VPD Recipe 1: Lower Height, Adequate Healing Success, Low Auxiliary Roots

| Time elapsed <48 hours | |
|---|---|
| Controlling Vapor pressure deficit to greater than 0.189 kPa (maintain humidity (RH) <95%) | Wet Air delivery system (161) is activated (ON) when humidity sensor (165) is below 95% RH |
| Controlling air temperature to a set point of 28° C. with +/−0.5° C. | Heaters in the Wet Air delivery system (156) and Dry Air Delivery System (155) and Recirculation Loop Air Delivery System (211) maintain air temperature at 28° C. |
| Vertical air velocity at the canopy: 0.0 m s$^{-1}$ | Vertical Air Delivery System (162, 163, 164) blower is OFF during this elapsed time |
| Controlling root temperature set point of 28° C. with +/−0.5° C. | Root temperature control System loop 133 is activated (ON) when substrate temperature sensor (183) is below 28° C. |
| No CO$_2$ injection | CO$_2$ injection valve (132) is off during this elapsed time |
| Controlling light intensity at 85 µmol m$^{-2}$ s$^{-1}$ for 18 h | Variable Light Source_(105) are dimmed to 85 µmol m$^{-2}$ s$^{-1}$ intensity |
| Controlling light spectrum at 40% of greater blue photon flux and 60% or lower red photon flux | Variable Light Source_(105) spectrum is maintained ay 40B:60R during this elapsed time |
| Sub-irrigation is performed once (water T 28° C.) | Irrigation Water Delivery System (130) is turn ON for 10 minutes when time elapsed = 0 (program start) |
| Time elapsed >=48 and <72 hours: | |
| Controlling Vapor pressure deficit to greater than 0.189 Controlling Vapor pressure deficit, to a target set point of 0.492 kPa (RH = 87%) | Wet Air delivery system (161) is activated (ON) when humidity sensor (165) is below 85% RH Dry Air Delivery System (160) is activated (ON) when humidity sensor (165) is above 87% RH Wet Air delivery system (161) and Dry Air Delivery System (160) are both (OFF) when humidity sensor (165) is >85% RH and <87% RH |
| Controlling air temperature to a set point of 28° C. with +/−0.5° C. | Heaters in the Wet Air delivery system (156) and Dry Air Delivery System (155) and loop air system (211) maintain air temperature at 28° C. |
| Controlling root temperature set point of 28° C. with +/−0.5° C. | Root temperature control System loop 133 is activated (ON) when substrate temperature sensor (183) is below 28° C. |
| Vertical air velocity at the canopy: 0.0 m s$^{-1}$ | Vertical air delivery system (162, 163, 164) blower is OFF during this elapsed time |
| CO$_2$ injection be maintained at 400 µmol mol$^{-1}$ | CO$_2$ injection valve (132) turns (ON) when CO$_2$ sensor (171) <400 µmol mol$^{-1}$. When CO$_2$ sensor is >600 µmol mol$^{-1}$ valve turns (OFF) |
| Controlling light intensity at 120 µmol m$^{-2}$ s$^{-1}$ for 18 h | Variable Light Source (105) increase intensity to 87 µmol m$^{-2}$ s$^{-1}$ |
| Controlling light spectrum at 40% of greater blue photon flux and 60% or lower red photon flux | Variable Light Source (105) spectrum is maintained ay 40B:60R during this elapsed time |
| No Sub-irrigation is performed | Irrigation Water Delivery System (130) is OFF |
| Time elapsed >=72 and <96 hours | |
| Controlling Vapor pressure deficit, to a target set point of 0.681 kPa (RH = 82%) | Wet Air delivery system (161) is activated (ON) when humidity sensor (165) is below 77% RH Dry Air Delivery System (160) is activated (ON) when humidity sensor is above 82% RH Wet Air delivery system (161) and Dry Air Delivery System (160) are both (OFF) when humidity sensor (165) is >77% RH and <82% RH |
| Controlling air temperature to a set point of 28° C. with +/−0.5° C. | Heaters in the Wet Air delivery system (156) and Dry Air Delivery System (155) and loop air system (211) maintain air temperature at 28° C. |

TABLE 1-continued

VPD Recipe 1: Lower Height, Adequate Healing Success, Low Auxiliary Roots

| | |
|---|---|
| Controlling root temperature set point of 28° C. with +/−0.5° C. | Root temperature control System loop (133) is activated (ON) when substrate temperature sensor (183) is below 28° C. |
| Vertical air velocity at the canopy: 0.0 m s$^{-1}$ | Air velocity system (162, 163, 164) blower is OFF during this elapsed time |
| $CO_2$ injection be maintained at 400 μmol mol$^{-1}$ | $CO_2$ injection valve (132) turns (ON) when $CO_2$ sensor (171) <400 μmol mol$^{-1}$; when $CO_2$ sensor is >600 μmol mol$^{-1}$ valve turns (OFF) |
| Controlling light intensity at 85 μmol m$^{-2}$ s$^{-1}$ for 18 h | Variable Light Source (105) are dimmed to 85 μmol m$^{-2}$ s$^{-1}$ intensity |
| Controlling light spectrum at 40% of greater blue photon flux and 60% or lower red photon flux | Variable Light Source (105) spectrum is maintained ay 40B:60R during this elapsed time |
| No Sub-irrigation is performed | Irrigation Water Delivery System (130) is OFF |

Time elapsed >=96 and <120 hours

| | |
|---|---|
| Controlling Vapor pressure deficit, to a target set point of 0.946 kPa (RH = 75%) | Wet Air delivery system (161) is activated (ON) when humidity sensor <70% RH<br>Dry Air Delivery System (160) is activated (ON) when humidity sensor >75% RH<br>Wet Air delivery system (156) and Dry Air Delivery System (155) are both (OFF) when humidity sensor is >70% RH and <75% RH |
| Controlling air temperature to a set point of 28° C. with +/−0.5° C. | Heaters in the Wet Air delivery system (156) and Dry Air Delivery System (155) and loop air system (211) maintain air temperature at 28° C. |
| Controlling root temperature set point of 28° C. with +/−0.5° C. | Root temperature control System loop (133) is activated (ON) when substrate temperature sensor (183) is below 28° C. |
| Vertical air velocity at the canopy: 0.0 m s$^{-1}$ | Air velocity system (162, 163, 164) blower is OFF during this elapsed time |
| $CO_2$ injection be maintained at 400 μmol mol$^{-1}$ | $CO_2$ injection valve (132) turns (ON) when $CO_2$ sensor (171) <400 μmol mol$^{-1}$; when $CO_2$ sensor is >600 μmol mol$^{-1}$ valve turns (OFF) |
| Controlling light intensity at 85 μmol m$^{-2}$ s$^{-1}$ for 18 h | Variable Light Source (105) are dimmed to 85 μmol m$^{-2}$ s$^{-1}$ intensity |
| Controlling light spectrum at 40% of greater blue photon flux and 60% or lower red photon flux | Variable Light Source (105) spectrum is maintained ay 40B:60R during this elapsed time |
| No Sub-irrigation is performed | Irrigation Water Delivery System (130) is OFF |

Time elapsed >=120 hours
Controlling Vapor pressure deficit to >/=0.946 kPa (RH <75%)

| | |
|---|---|
| Controlling Vapor pressure deficit, to a target set point >/=0.946 kPa (RH = 75%) (room RH level) | Wet Air delivery system (161) is (OFF)<br>Dry Air Delivery System (160) is activated (ON) all the time |
| Controlling air temperature to a set point of 28° C. with +/−0.5° C. | Heaters in the Wet Air delivery system (156) and Dry Air Delivery System (155) and loop air system (211) maintain air temperature at 28° C. |
| Controlling root temperature set point of 28° C. with +/−0.5° C. | Root temperature control System loop is activated (ON) when substrate temperature sensor (183) is below 28° C. |
| Vertical air velocity at the canopy: 0.3 m s$^{-1}$ | Air velocity system (162, 163, 164) blower is ON at Mid CFM setting during this elapsed time |
| $CO_2$ injection OFF (levels back to room) | $CO_2$ injection valve (132) turns (OFF) at this elapsed time. |

TABLE 1-continued

VPD Recipe 1: Lower Height, Adequate Healing Success, Low Auxiliary Roots

| | |
|---|---|
| Controlling light intensity at 85 µmol m$^{-2}$ s$^{-1}$ for 18 h | Variable Light Source (105) is dimmed to 85 µmol m$^{-2}$ s$^{-1}$ intensity |
| Controlling light spectrum at 40% of greater blue photon flux and 60% or lower red photon flux | Variable Light Source (105) is spectrum is maintained ay 40B:60R during this elapsed time |
| Sub-irrigation is performed once (water T 28° C.) | Irrigation Water Delivery System (130) is turn ON for 10 minutes when time elapsed = 120 h |

TABLE 2

VPD Recipe 2: Higher Height, Adequate Healing Success, High Auxiliary Roots

| Time elapsed <72 hours: | |
|---|---|
| Controlling Vapor pressure deficit to greater than 0.189 kPa (maintain humidity (RH) <95%) | Wet Air delivery system (161) is activated (ON) when humidity sensor (165) is below 95% RH |
| Controlling air temperature to a set point of 28° C. with +/−0.5° C. | Heaters in the Wet Air delivery system (156) and Dry Air Delivery System (155) and loop air system (211) maintain air temperature at 28° C. |
| Vertical air velocity at the canopy: 0.0 m s$^{-1}$ | Air velocity system (162, 163, 164) blower is OFF during this elapsed time |
| Controlling root temperature set point of 28° C. with +/−0.5° C. | Root temperature control System loop (133) is activated (ON) when substrate temperature sensor (183) is below 28° C. |
| No CO$_2$ injection | CO$_2$ injection valve (132) valve is off during this elapsed time |
| Controlling light intensity at 85 µmol m$^{-2}$ s$^{-1}$ for 18 h | Variable Light Source (105) are dimmed to 85 µmol m$^{-2}$ s$^{-1}$ intensity |
| Controlling light spectrum at 40% of greater blue photon flux and 60% or lower red photon flux | Variable Light Source (105) spectrum is maintained ay 40B:60R during this elapsed time |
| Sub-irrigation is performed once (water T 28° C.) | Irrigation Water Delivery System (130) is turn ON for 10 minutes when time elapsed = 0 (program start) |
| Time elapsed >=72 and <96 hours: | |
| Controlling Vapor pressure deficit, to a target set point of 0.303 kPa (RH = 92%) | Wet Air delivery system (161) is activated (ON) when humidity sensor (165) is below 90% RH<br>Dry Air Delivery System (160) is activated (ON) when humidity sensor (165) is above 92% RH<br>Wet Air delivery system (161) and Dry Air Delivery System (160) are both (OFF) when humidity sensor is >90% RH and <92% RH |
| Controlling air temperature to a set point of 28° C. with +/−0.5° C. | Heaters in the Wet Air delivery system (156) and Dry Air Delivery System (155) and loop air system (211) maintain air temperature at 28° C. |
| Vertical air velocity at the canopy: 0.0 m s$^{-1}$ | Air velocity system (162, 163, 164) blower is OFF during this elapsed time |
| Controlling root temperature set point of 28° C. with +/−0.5° C. | Root temperature control System loop (133) is activated (ON) when substrate temperature sensor (183) is below 28° C. |
| CO$_2$ injection be maintained at 400 µmol mol$^{-1}$ | CO$_2$ injection valve (132) turns (ON) when CO$_2$ sensor <400 µmol mol$^{-1}$; when CO$_2$ sensor is >600 µmol mol$^{-1}$ valve turns (OFF) |
| Controlling light intensity at 85 µmol m$^{-2}$ s$^{-1}$ for 18 h | Variable Light Source (105) are dimmed to 85 µmol m$^{-2}$ s$^{-1}$ intensity |
| Controlling light spectrum at 40% of greater blue photon flux and 60% or lower red photon flux | Variable Light Source (105) spectrum is maintained ay 40B:60R during this elapsed time |
| No Sub-irrigation is performed | Irrigation Water Delivery System (130) is left OFF |
| Time elapsed >=96 and <120 hours | |
| Controlling Vapor pressure deficit, to a target set point of 0.492 kPa (RH = 87%) | Wet Air delivery system (161) is activated (ON) when humidity sensor (165) is below 85% RH |

TABLE 2-continued

| VPD Recipe 2: Higher Height, Adequate Healing Success, High Auxiliary Roots | |
|---|---|
| | Dry Air Delivery System (160) is activated (ON) when humidity sensor (165) is above 87% RH |
| | Wet Air delivery system (161) and Dry Air Delivery System (160) are both (OFF) when humidity sensor is >85% RH and <87% RH |
| Controlling air temperature to a set point of 28° C. with +/−0.5° C. | Heaters in the Wet Air delivery system (156) and Dry Air Delivery System (155) and loop air system (211) maintain air temperature at 28° C. |
| Vertical air velocity at the canopy: 0.0 m s$^{-1}$ | Air velocity system (162, 163, 164) blower is OFF during this elapsed time |
| Controlling root temperature set point of 28° C. with +/−0.5° C. | Root temperature control System loop (133) is activated (ON) when substrate temperature sensor (183) is below 28° C. |
| $CO_2$ injection be maintained at 400 µmol mol$^{-1}$ | $CO_2$ injection valve (132) turns (ON) when $CO_2$ sensor <400 µmol mol$^{-1}$; when $CO_2$ sensor is >600 µmol mol$^{-1}$ valve turns (OFF) |
| Controlling light intensity at 85 µmol m$^{-2}$ s$^{-1}$ for 18 h | Variable Light Source (105) is dimmed to 85 µmol m$^{-2}$ s$^{-1}$ intensity |
| Controlling light spectrum at 40% of greater blue photon flux and 60% or lower red photon flux | Variable Light Source (105) spectrum is maintained ay 40B:60R during this elapsed time |
| No Sub-irrigation is performed | Irrigation Water Delivery System (130) is left OFF |
| Time elapsed >=120 and <132 hours | |
| Controlling Vapor pressure deficit, to a target set point of 0.681 kPa (RH = 82%) | Wet Air delivery system (161) is activated (ON) when humidity sensor (165) is below 77% RH |
| | Dry Air Delivery System (160) is activated (ON) when humidity sensor (165) is above 82% RH |
| | Wet Air delivery system (161) and Dry Air Delivery System (160) are both (OFF) when humidity sensor is >77% RH and <82% RH |
| Controlling air temperature to a set point of 28° C. with +/−0.5° C. | Heaters in the Wet Air delivery system (156) and Dry Air Delivery System (155) and loop air system (211) maintain air temperature at 28° C. |
| Controlling root temperature set point of 28° C. with +/−0.5° C. | Root temperature control System loop (133) is activated (ON) when substrate temperature sensor (183) is below 28° C. |
| Vertical air velocity at the canopy: 0.3 m s$^{-1}$ | Air velocity system (162, 163, 164) blower is ON at Mid CFM setting during this elapsed time |
| $CO_2$ injection be maintained at 400 µmol mol$^{-1}$ | $CO_2$ injection valve (132) valve turns (ON) when $CO_2$ sensor <400 µmol mol$^{-1}$; when $CO_2$ sensor is >600 µmol mol$^{-1}$ valve turns (OFF) |
| Controlling light intensity at 85 µmol m$^{-2}$ s$^{-1}$ for 18 h | Variable Light Source (105) are dimmed to 85 µmol m$^{-2}$ s$^{-1}$ intensity |
| Controlling light spectrum at 40% of greater blue photon flux and 60% or lower red photon flux | Variable Light Source (105) spectrum is maintained ay 40B:60R during this elapsed time |
| No Sub-irrigation is performed | Irrigation Water Delivery System (130) is OFF |
| Time elapsed >=132 and <144 hours | |
| Controlling Vapor pressure deficit, to a target set point of 0.946 kPa (RH = 75%) | Wet Air delivery system (161) is activated (ON) when humidity sensor (165) <70% RH |
| | Dry Air Delivery System (160) is activated (ON) when humidity sensor (165) >75% RH |
| | Wet Air delivery system (161) and Dry Air Delivery System (160) are both (OFF) when humidity sensor is >70% RH and <75% RH |
| Controlling air temperature to a set point of 28° C. with +/−0.5° C. | Heaters in the Wet Air delivery system (156) and Dry Air Delivery System (155) and loop air system (211) maintain air temperature at 28° C. |

TABLE 2-continued

| VPD Recipe 2: Higher Height, Adequate Healing Success, High Auxiliary Roots | |
| --- | --- |
| Controlling root temperature set point of 28° C. with +/−0.5° C. | Root temperature control System loop is activated (ON) when substrate temperature sensor (183) is below 28° C. |
| Vertical air velocity at the canopy: 0.3 m s$^{-1}$ | Air velocity system (162, 163, 164) blower is ON at Mid CFM setting during this elapsed time |
| $CO_2$ injection be maintained at 400 μmol mol$^{-1}$ | $CO_2$ injection valve (132) turns (ON) when $CO_2$ sensor <400 μmol mol$^{-1}$; when $CO_2$ sensor is >600 μmol mol$^{-1}$ valve turns (OFF) |
| Controlling light intensity at 85 μmol m$^{-2}$ s$^{-1}$ for 18 h | Variable Light Source (105) are dimmed to 85 μmol m$^{-2}$ s$^{-1}$ intensity |
| Controlling light spectrum at 40% of greater blue photon flux and 60% or lower red photon flux | Variable Light Source (105) spectrum is maintained ay 40B:60R during this elapsed time |
| No Sub-irrigation is performed | Irrigation Water Delivery System (130) is OFF |
| Time elapsed >=144 hours | |
| Controlling Vapor pressure deficit, to a target set point >/=0.946 kPa (RH = 75%) (room RH level) | Wet Air delivery system (161) is (OFF) Dry Air Delivery System (160) is activated (ON) all the time |
| Controlling air temperature to a set point of 28° C. with +/−0.5° C. | Heaters in the Wet Air delivery system (156) and Dry Air Delivery System (155) and loop air system (211) maintain air temperature at 28° C. |
| Controlling root temperature set point of 28° C. with +/−0.5° C. | Root temperature control System loop (133) is activated (ON) when substrate temperature sensor (183) is below 28° C. |
| Vertical air velocity at the canopy: 0.3 m s$^{-1}$ | Air velocity system (162, 163, 164) blower is ON at Mid CFM setting during this elapsed time |
| $CO_2$ injection OFF (levels back to room) | $CO_2$ injection valve (132) turns (OFF) at this elapsed time. |
| Controlling light intensity at 85 μmol m$^{-2}$ s$^{-1}$ for 18 h | Variable Light Source (105) are dimmed to 85 μmol m$^{-2}$ s$^{-1}$ intensity |
| Controlling light spectrum at 40% of greater blue photon flux and 60% or lower red photon flux | Variable Light Source (105) spectrum is maintained ay 40B:60R during this elapsed time |
| Sub-irrigation is performed once (water T 28° C.) | Irrigation Water Delivery System (130) is turn ON for 10 minutes when time elapsed = 12 h |

Results: Data comparison for both methods (Method 1 and 2). Healing success is defined as the percentage of grafted plants that successfully join (vascular cambium, xylem and phloem vessels). Healing success is assessed by number of plants that are alive by the end of the healing cycle. Any healing success at and above 90% is considered acceptable. Both treatments yield adequate healing success (See FIGS. 10 and 11). Stretched plants are undesirable, VPD recipe 1 had adequate plant height while VPD recipe 2 produced stretched plants (See FIG. 12). Adventitious roots are undesirable and VPD recipe 2 had higher adventitious roots (See FIG. 13).

Optimizing plant cuttings for maximum root growth and plant quality. The present disclosure claims various systems that perform various methods to optimize plant growth outcomes including optimizing root growth and plant quality through control of the microclimate. In various embodiments, the present disclosure illustrates on exemplary method to maximize rooting growth percentage and plant quality using Cannabis unrooted cuttings. A high-quality transplant is mainly defined by high dry mass, high root development, and high plant compactness.

Unrooted cuttings (clones) are the main method of propagation for medicinal and recreational Cannabis. Stock plants are maintained in a control environment until reaching appropriate size. Primary and secondary branches from the stock plant (nodal points) can be removed and use to propagate new plants. When the branch is removed from the stock plant (cutting), it may be placed in an optimal environment that will promote root growth and maintain plant quality.

The optimal rooting environment can be maintained by the combination of adequate light intensity, spectrum, air/substrate temperature, humidity and VPD control. In addition, to maximize rooting and maintain plant quality, dynamic environmental control recipe is recommended. Such controls improve the rooting, growth, and quality of Cannabis clones. Other environmental factors are held constant during the 260 hours elapsed time presented below.

Figure 15:
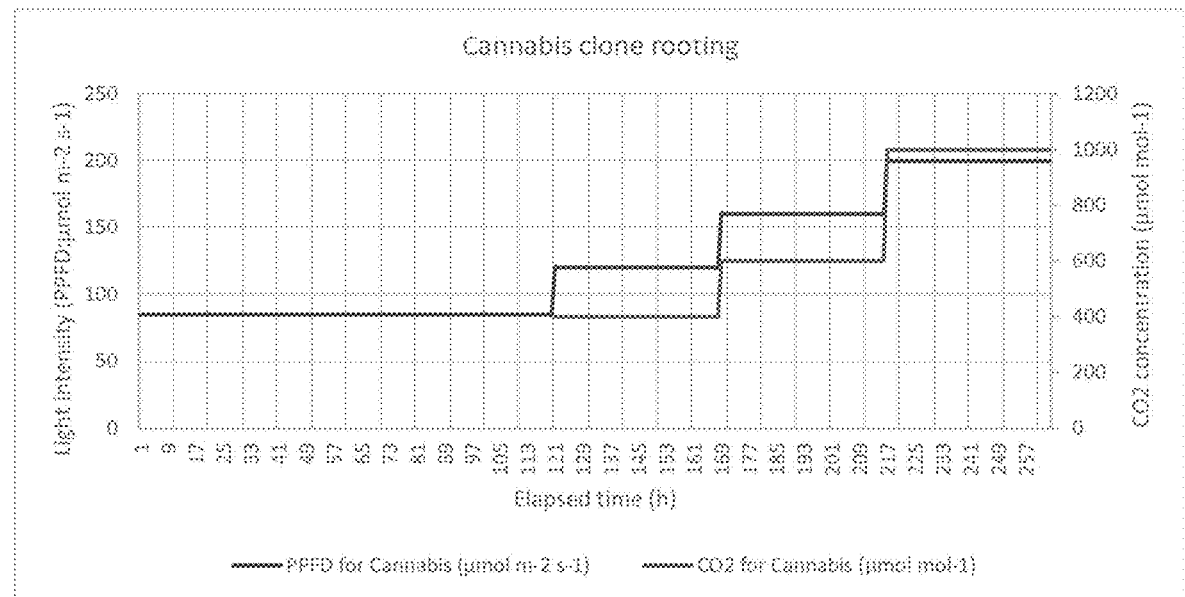
FIG. 15 illustrates a graph of light intensity and carbon dioxide concentration over time during clone rooting, in accordance with various embodiments.
Figure 16:
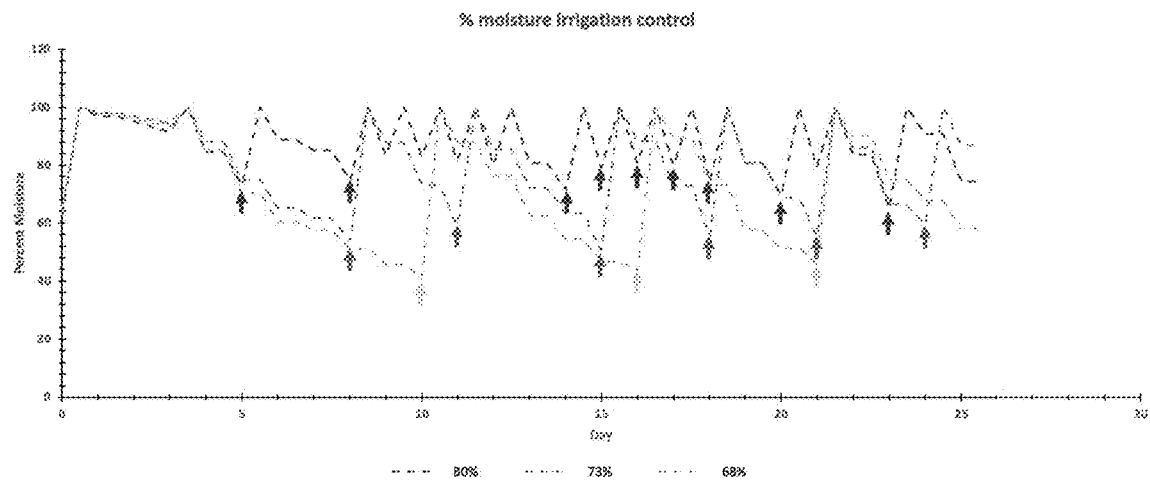
FIG. 16 illustrates a graph of moisture over time during irrigation control, in accordance with various embodiments.

In various embodiments, the present disclosure controls the microclimate to optimize rooting of cannabis based on control of VPD, Light and CO2 as shown in FIG. 15. Graphical Representation For The Dynamic Control Of VPD & Air Velocity and FIG. 16 Graphical Representation For The Dynamic Control Light Intensity, And CO2 Concentration.

TABLE 3

| Cannabis Rooting Recipe (Maximize Root Dev And Biomass) ||
|---|---|
| Time elapsed <120 hours (5 days) ||
| Controlling Vapor pressure deficit to greater than 0.189 kPa (maintain humidity (RH) <95%) | Wet Air delivery system (161) is activated (ON) when humidity sensor is below 95% RH |
| Controlling air temperature to a set point of 28° C. with +/−0.5° C. | Heaters in the Wet Air delivery system (156) and Dry Air Delivery System (155) and loop air system (211) maintain air temperature at 28° C. |
| Controlling root temperature set point of 28° C. with +/−0.5° C. | Root temperature control System loop (133) is activated (ON) when substrate temperature sensor (183) is below 28° C. |
| Vertical air velocity at the canopy: Off | Air velocity system (162, 163, 164) is off during this elapsed time |
| No $CO_2$ injection | $CO_2$ injection valve (132) is off during this elapsed time |
| Controlling light intensity at 85 μmol $m^{-2}$ $s^{-1}$ for 18 h | Variable Light Source_(105) are dimmed to 85 μmol $m^{-2}$ $s^{-1}$ intensity |
| Controlling light spectrum at 40% of greater blue photon flux and 60% or lower red photon flux | Variable Light Source_(105) spectrum is maintained ay 40B:60R during this elapsed time |
| Sub-irrigation is performed once (water T 28° C.) | Irrigation Water Delivery System_(130) is turn ON for 10 minutes when time elapsed = 0 (program start) |
| Time elapsed >20 and <168 hours (2 days) ||
| Controlling Vapor pressure deficit, to a target set point of 0.492 kPa (RH = 87%) | Wet Air delivery system (161) is activated (ON) when humidity sensor (165) is below 85% RH<br>Dry Air Delivery System_(160) is activated (ON) when humidity sensor (165)_is above 87% RH<br>Wet Air delivery system (161) and Dry Air Delivery System_(160) are both (OFF) when humidity sensor is >85% RH and <87% RH |
| Controlling air temperature to a set point of 28° C. with +/−0.5° C. | Heaters in the Wet Air delivery system (156) and Dry Air Delivery System (155) and loop air system (211) maintain air temperature at 28° C. |
| Controlling root temperature set point of 28° C. with +/−0.5° C. | Root temperature control System loop (133) is activated (ON) when substrate temperature sensor (183) is below 28° C. |
| Vertical air velocity at the canopy: 0.1 m $s^{-1}$ | Air velocity system (162, 163, 164) blower is ON at low CFM setting during this elapsed time |
| $CO_2$ injection be maintained at 400 μmol $mol^{-1}$ | $CO_2$ injection valve (132) turns (ON) when $CO_2$ sensor <400 μmol $mol^{-1}$; when $CO_2$ sensor is >600 μmol $mol^{-1}$ valve turns (OFF) |
| Controlling light intensity at 120 μmol $m^{-2}$ $s^{-1}$ for 18 h | Variable Light Source_(105) increase intensity to 120 μmol $m^{-2}$ $s^{-1}$ |
| Controlling light spectrum at 40% of greater blue photon flux and 60% or lower red photon flux | Variable Light Source_(105) spectrum is maintained ay 40B:60R during this elapsed time |
| Sub-irrigation is performed once (water T 28° C.) | Irrigation Water Delivery System_(130) is turn ON for 10 minutes when time elapsed = 120 h |
| Time elapsed >168 and <216 hours (2 days) ||
| Controlling Vapor pressure deficit, to a target set point of 0.681 kPa (RH = 82%) | Wet Air delivery system (161) is activated (ON) when humidity sensor (165) is below 77% RH<br>Dry Air Delivery System_(160) is activated (ON) when humidity sensor (165)_is above 82% RH<br>Wet Air delivery system (161) and Dry Air Delivery System_(160) are both (OFF) when humidity sensor is >77% RH and <82% RH |
| Controlling air temperature to a set point of 28° C. with +/−0.5° C. | Heaters in the Wet Air delivery system (156) and Dry Air Delivery System (155) and loop air system (211) maintain air temperature at 28° C. |
| Controlling root temperature set point of 28° C. with +/−0.5° C. | Root temperature control System loop is activated (ON) when substrate temperature sensor (183) is below 28° C. |
| Vertical air velocity at the canopy: 0.3 m $s^{-1}$ | Air velocity system (162, 163, 164) is ON at Mid CFM setting during this elapsed time |

TABLE 3-continued

Cannabis Rooting Recipe (Maximize Root Dev And Biomass)

| | |
|---|---|
| $CO_2$ injection be maintained at 600 μmol $mol^{-1}$ | $CO_2$ injection valve (132) turns (ON) when $CO_2$ sensor <600 μmol $mol^{-1}$; when $CO_2$ sensor is >800 μmol $mol^{-1}$ valve turns (OFF) |
| Controlling light intensity at 160 μmol $m^{-2}$ $s^{-1}$ for 18 h | Variable Light Source_(105) increase intensity to 160 μmol $m^{-2}$ $s^{-1}$ |
| Controlling light spectrum at 40% of greater blue photon flux and 60% or lower red photon flux | Variable Light Source_(105) spectrum is maintained ay 40B:60R during this elapsed time |
| Sub-irrigation is performed once (water T 28° C.) | Irrigation Water Delivery System_(130) is turn ON for 10 minutes when time elapsed = 120 (program start) |
| Time elapsed >216 and <264 hours (2 days) | |
| Controlling Vapor pressure deficit, to a target set point of 0.946 kPa (RH = 75%) | Wet Air delivery system (161) is activated (ON) when humidity sensor (165) <70% RH Dry Air Delivery System_(160) is activated (ON) when humidity sensor (165) >75% RH Wet Air delivery system (161) and Dry Air Delivery System_(160) are both (OFF) when humidity sensor is >70% RH and <75% RH |
| Controlling air temperature to a set point of 28° C. with +/−0.5° C. | Heaters in the Wet Air delivery system (156) and Dry Air Delivery System (155) and loop air system (211) maintain air temperature at 28° C. |
| Controlling root temperature set point of 28° C. with +/−0.5° C. | Root temperature control System loop (133) is activated (ON) when substrate temperature sensor (183) is below 28° C. |
| Vertical air velocity at the canopy: 1.0 m $s^{-1}$ | Air velocity system (162, 163, 164) is ON at Mid-High CFM setting during this elapsed time |
| $CO_2$ injection be maintained at 1000 μmol $mol^{-1}$ | $CO_2$ injection valve (132) turns (ON) when $CO_2$ sensor <1000 μmol $mol^{-1}$; when $CO_2$ sensor is >1200 μmol $mol^{-1}$ valve turns (OFF) |
| Controlling light intensity at 200 μmol $m^{-2}$ $s^{-1}$ for 18 h | Variable Light Source_(105) increase intensity to 200 μmol $m^{-2}$ $s^{-1}$ |
| Controlling light spectrum at 40% of greater blue photon flux and 60% or lower red photon flux | Variable Light Source_(105) spectrum is maintained ay 40B:60R during this elapsed time |
| Sub-irrigation is performed once (water T 28° C.) | Irrigation Water Delivery System_(130) is turn ON for 10 minutes when time elapsed = 120 (program start) |

Method to Optimize field green transplant production. Cabbage, celery, broccoli, cauliflower, and lettuce are produced in the field. Field producers depend on high quality transplants to start production in the field. A high-quality transplant is mainly defined by 1) good root development, adequate shoot growth, and compactness (short plants).

Under adequate environmental conditions (light, CO2, humidity, temperature) water management is a useful strategy to improve root development. For example, overwatering will increase photo-assimilate partitioning to the shoot and less to the roots (developing a stretched plant with low root: shoot ratio); in contrast, high water limitation will increase root development but will also in consequence reduce shoot growth.

Therefore, the optimal moisture content is key to maximize root development, maintain good shoot growth and compactness. The current disclosure allows to accurately control irrigation based growing-table weight and in conjunction with accurate management of other environmental factors at the microclimate. Growing-table weight is composed of =the table weight+the tray weight (trays where plants are sown)+the substrate weight+plant weight+the water weight. Since table, tray, and substrate weight are constants, and plant weight can be predicted, changing-water weight can be calculated. Water weight=growing table weight (monitor by system)−Tray weight (known)−Substrate weight (known)−plant weight (predicted).

Based on the water weight, % moisture of substrate can be calculated. For example: 100% moisture content=Growing table weight after irrigation. 80% moisture content=Growing-table weight after irrigation*0.2 (20% less water). Plant weight can also be removed based on days of growth.

Figure 17:
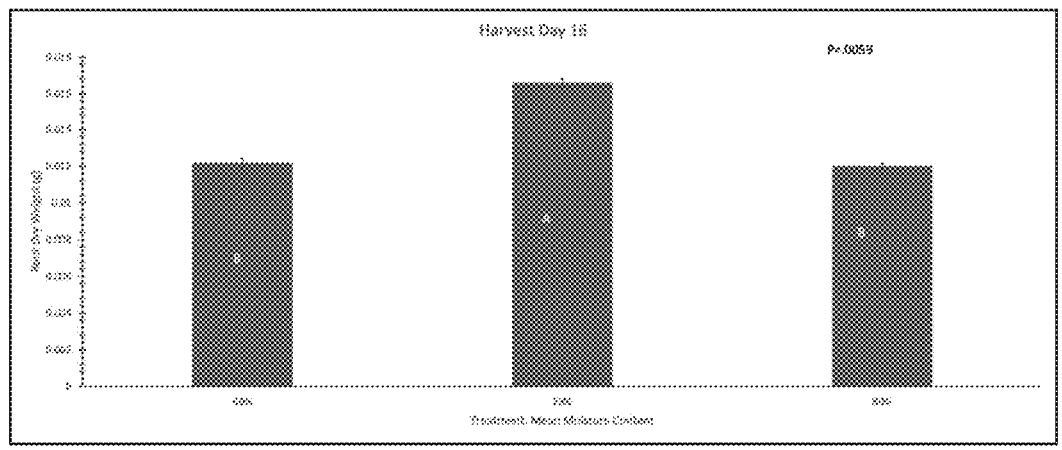
FIG. 17 illustrates a graph of root growth in response to different water control schedules, in accordance with various embodiments.
Figure 18:
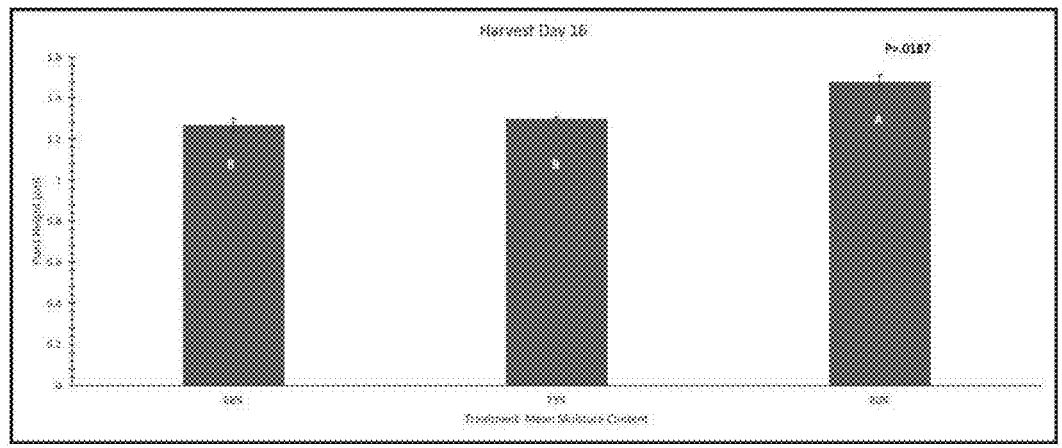
FIG. 18 illustrates a graph of plant height in response to different water control schedules, in accordance with various embodiments.
Figure 19:
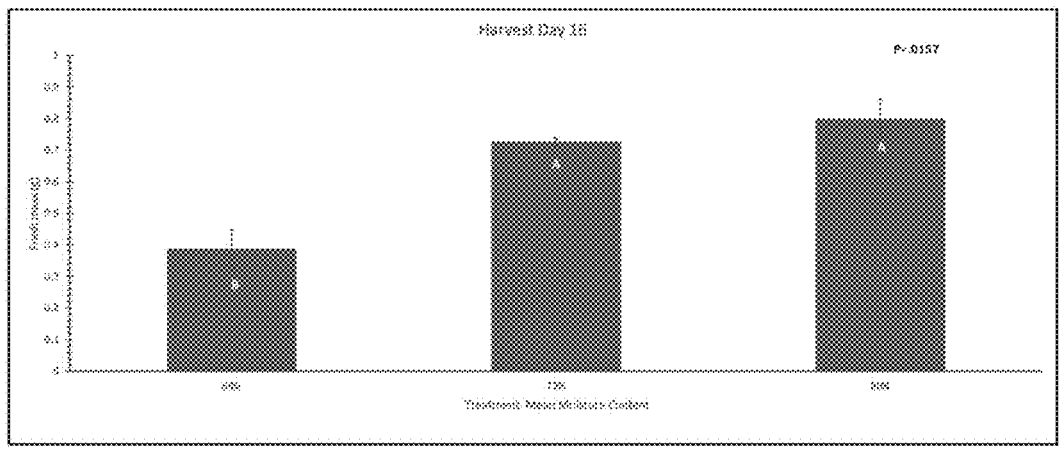
FIG. 19 illustrates a graph of plant fresh mass in response to different water control schedules, in accordance with various embodiments.
Figure 20:
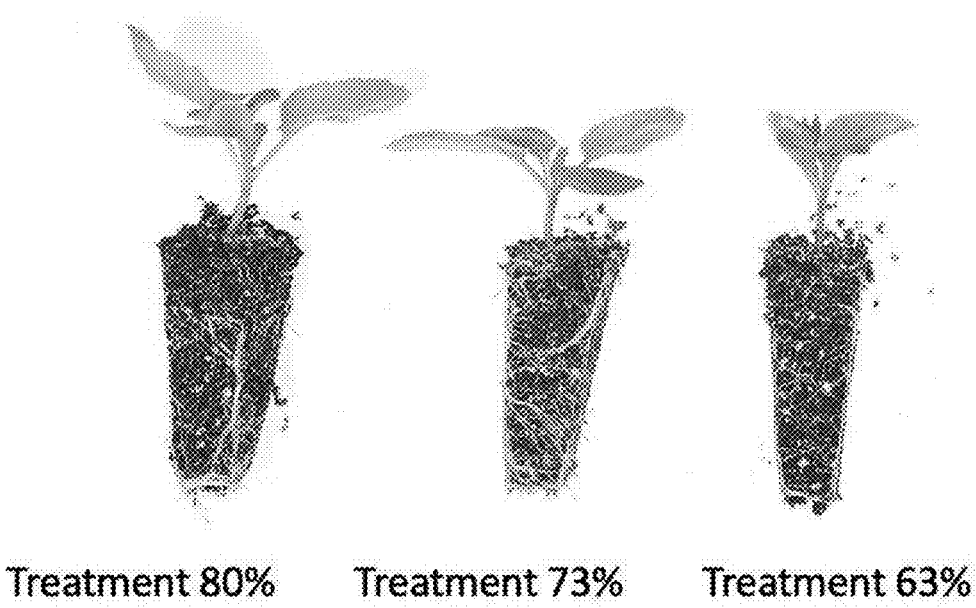
FIG. 20 illustrates depicts resulting rooting and growth of cabbage under various water control schedules, in accordance with various embodiments.

In various embodiments, the present disclosure controls and optimizes root development, shoot growth, and compactness for field greens seedlings based on control of soil moisture, VPD, Light and CO2 as shown in FIG. 17. Graphical Representation Of Maintaining Adequate Growing Environment And Irrigating Based On % Moisture Content based on weight, arrows represent irrigation actuation for 3 different moisture content treatments.

Plants were irrigated at 3 different moisture contents (80%, 75%, 70%) based on growing table weight thresholds. Each treatment was irrigated based on tray weight. Tray weight was correlated to moisture content. The figure above tracked predicted moisture content of tray and activated irrigation (arrows) when moisture dropped below a threshold. Key to FIG. 17 as follows:

Moisture content 80% (blue), irrigated when weight is = [Table weight]+[tray/substrate weight (number of trays in table*(fully saturated substrate weight+tray weight)]+[plant weight (predicted based on days in growing cycle)]*[0.20]

Moisture content 73% (orange), irrigated when weight is =[Table weight]+[tray/substrate weight (number of trays in table*(fully saturated substrate weight+tray weight)]+[plant weight (predicted based on days in growing cycle)]*[0.27]

Moisture content 68% (yellow), irrigated when weight is =[Table weight]+[tray/substrate weight (number of trays in table)*(fully saturated substrate weight+tray weight)]+[plant weight (predicted based on days in growing cycle)]*[0.32]

TABLE 4

Method for maintaining moisture content at an average 73% to optimize biomass and rooting Time elapsed <17 days

| | |
|---|---|
| Controlling Vapor pressure deficit, to a target set point >/=0.946 kPa (RH = 75%) (room RH level) | Wet Air delivery system (161) is (OFF) when humidity Dry Air Delivery System_(160) is activated (ON) all the time |
| Controlling light intensity at 200 µmol m$^{-2}$ s$^{-1}$ for 18 h | Variable Light Source_(105) increase intensity to 200 µmol m$^{-2}$ s$^{-1}$ |
| Controlling light spectrum at 40% of greater blue photon flux and 60% or lower red photon flux | Variable Light Source_(105) spectrum is maintained ay 40B:60R during this elapsed time |
| $CO_2$ injection be maintained at 1000 µmol mol$^{-1}$ | $CO_2$ injection valve (132) turns (ON) when $CO_2$ sensor <1000 µmol mol$^{-1}$; when $CO_2$ sensor is >1200 µmol mol$^{-1}$ valve turns (OFF) |
| Controlling root temperature set point of 28° C. with +/−0.5° C. | Root temperature control System loop (133) is activated (ON) when substrate temperature sensor (183) is below 25° C. |
| Controlling air temperature to a set point of 22° C. with +/−0.5° C. | Heaters in the Wet Air delivery system (156) and Dry Air Delivery System (155) and loop air system (211) maintain air temperature at 22° C. |
| Sub-irrigation is performed based on table weight correlated to substrate moisture content to maintain a mean moisture content of 73% (water T 28° C.) | Irrigation Water Delivery System_(130) is turn ON when moisture content in the tray reaches 55.5% based on Grow Shelf Weight Sensor (184) of 5.52-6.01 lbs. |

As used herein, the term "about" may refer to a ±10% variation from the nominal value. It is to be understood that such a variation is always included in any given value provided herein, whether or not specifically referred to.

Any of the operations described herein may be implemented in an electronic computer system that includes one or more non-transitory storage devices having stored therein, individually or in combination, instructions that when executed by circuitry perform the operations. Also, it is intended those operations described herein may be distributed across a plurality of physical devices, such as processing structures at more than one different physical location. The storage device includes any type of tangible medium, for example, any type of disk including hard disks, floppy disks, optical discs, compact disc read-only memories (CD-ROMs), compact disc-rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

In various embodiments, a system to grow plants may comprise a plant grow shelf comprising a bottom defining plane and four substantially vertical sides operatively and fluidically sealed and coupled to the bottom wherein the plant grow shelf is configured to sealedly receive, irrigation and heat exchanger fluid lines through the sides. A grate on which growing containers sit and receive irrigation fluid may be sized to fit within the interior of the plant grow shelf and positioned above the heat exchanger. A manually operated electrically powered, variable intensity, spectrum, and duration light source functionally mounted above the growing shelf configured to provide light to the plant growing containers at a specific spectrum, intensity, and duration.

In various embodiments, a plant irrigation fluid delivery system may comprise various irrigation fluid delivery components fluidly and functionally connected to the macroclimate irrigation fluid source and configured to draw macroclimate irrigation fluids and deliver such irrigation fluids to the interior area of the plant grow shelf and drain excess irrigation fluid back to the macroclimate. A manually controlled electrically powered variable speed irrigation fluid pump may be fluidly and functionally connected to the macroenvironment, the irrigation fluid delivery components, electrical power, and macroclimate irrigation fluid sources. A manually operated variable set-point irrigation fluid flow regulator device may be functionally and operatively coupled to the outlet or inlet of the variable speed irrigation fluid pump and irrigation fluid delivery components to control the irrigation fluid flow rate within the irrigation fluid delivery system to deliver irrigation fluid at a predetermined rate.

In various embodiments, a wet air delivery system may comprise various fluid delivery components fluidly and functionally connected to the macroclimate air source and configured to draw microclimate air and deliver it to the area proximate to the area above the grow shelf. A variable mist water fogger may be functionally connected to the macroclimate power and fluid source and wet air delivery system configured to generate humid air within the wet air delivery system. An electrically powered manually controlled variable speed wet air blower may be functionally connected to the wet air delivery system and configured to draw air from macroclimate and variable mist fogger. A manually operated variable set-point irrigation wet air heater may be operatively coupled to the outlet or inlet of the wet air blower and wet air delivery system configured to heat the wet air to a predetermined set-point. A wet air heater output temperature sensor may be operatively coupled to the output of the wet air heater and wet air delivery system. A manually operated variable set-point wet air flow regulator device fluidly may be connected to the outlet or inlet of the wet air blower and wet air delivery system configured to control the air flow within the wet air delivery system. A humidity sensor may be functionally mounted proximate to the top side of the grow shelf. A temperature sensor may be functional mounted proximate to the top side of the grow shelf. The system may deliver wet air to the plant microclimate at a predetermined air temperature and humidity.

In various embodiments, the wet air delivery system may further comprise an air distribution manifold fluidly and functionally connected to the output of wet air flow regulator device and mounted above the grow shelf that comprises a plurality of individual air delivery nozzles that extend substantially vertically downward from the air distribution manifold to deliver wet air to the plant canopy microclimate at a predetermined air velocity and flow rate. A grow shelf air velocity sensor may be functionally mounted in the area proximate above the grow shelf to deliver wet air to the plant canopy at a predetermined flowrate or velocity. An irrigation fluid heat exchanger may be sized to fit within the interior of the plant grow shelf under the grate. An electrically powered, manually operated variable speed heat exchanger pump fluidly and functionally connected to the macroenvironment electrical power and irrigation fluid sources. A heat exchanger apparatus may be functionally mounted within the internal area of the grow shelf configured to heat fluid held within the grow shelf.

In various embodiments, a heat exchanger water delivery system may comprise various fluid delivery components fluidly and functionally connected to the heat exchanger and macroclimate water source wherein the various fluid delivery components are configured to deliver water to the heat exchanger apparatus and return water back to the macroenvironment. A manually operated electrically powered variable set-point fluid heater may be connected to the outlet or inlet of the variable speed irrigation fluid pump configured to heat the water within the heat exchanger fluid delivery system. A heat exchanger heater output temperature sensor may be operatively coupled to the heat exchanger fluid delivery system. A manually operated variable set-point fluid flow regulator device may be fluidly connected to the variable speed heat exchanger fluid pump outlet configured to control the heat exchanger fluid flow rate within the heat exchanger fluid delivery system to deliver irrigation fluid at a predetermined temperature.

In various embodiments, a dry air delivery system may comprise various fluid delivery components fluidly and functionally connected to the macroclimate air source and the wet air delivery system. An electrically powered manually controlled variable speed dry air blower may be functionally connected to the dry air delivery system and configured to draw air from macroclimate. A manually operated variable set-point dry air heater may be operatively coupled to the outlet or inlet of the dry air blower and dry air delivery system configured to heat the dry air to a predetermined set-point. A dry air heater output temperature sensor may be operatively coupled to the dry air delivery system. A manually operated variable set-point dry air flow regulator device may be fluidly connected to the outlet or inlet of the dry air blower and dry air delivery system configured to control the air flow within the dry air delivery system. The wet air delivery system and dry air delivery systems may be functionally and operatively meet and mix at the air distribution manifold and deliver mixed air to the microenvironment.

In various embodiments, the system may comprise at least one $CO_2$ source. A $CO_2$ delivery system may comprise various $CO_2$ delivery components fluidly and functionally connected to the $CO_2$ flow regulator output and configured to mix $CO_2$ with the dry air delivery system at a predetermined $CO_2$ flow rate. A manually operated $CO_2$ flow regulator device may be fluidly and functionally connected at the outlet of the $CO_2$ source and the dry air delivery system upstream of the dry air heater to inject $CO_2$ into the dry air.

In various embodiments, the system may comprise a semi-rigid enclosure substantially surrounding a growing shelf defining a growing chamber wherein the internal area of the growing chamber is substantially sealed from the macroclimate air, provides adequate room for plants to grow, wherein the enclosure has at least one opening allowing the passage of an air delivery system to area proximate above the growing shelf, and wherein at least one portion of one internal side of the enclosure is transparent and wherein the enclosure has at least one opening in configured to allow passage of air and water lines to the internal area of the growing shelf.

In various embodiments, the enclosure may comprise a top side with light transmittance. The enclosure may comprise at least one vertical side is inwardly light reflective. The air distribution manifold may deliver mixed air to the microclimate through a single port. A grow shelf light spectrum sensor may be functionally and operatively mounted proximate to the area above the grow shelf and below the variable light source. A grow shelf $CO_2$ concentration sensor may be functionally and operatively mounted proximate to the area above the grow shelf close to plant canopy.

In various embodiments, a grow shelf weight sensor may be functionally and operatively mounted under the grow shelf. A plant soil temperature sensor may be functionally and operatively mounted with the soil contained in a representative growing container. A vertical connecting element may be functionally fastened to the growing shelf. An additional growing shelf may be functionally fastened to the vertical connecting element and positioned horizontally above or below another growing shelf in a vertically stacked orientation. The shelves may be sequentially stacked above another using a plurality of additional vertical connecting elements and shelves. Each grow shelf may comprise a dedicated light source functionally mounted above each growing shelf, a means to accept air from an air delivery system, a means to accept an irrigation water delivery system, a means to accept a heat exchanger water delivery system, a operatively mounted humidity sensor, a operatively mounted air temperature sensor, a operatively mounted shelf weight sensor, a operatively mounted $CO_2$ sensor, a operatively mounted air velocity sensor, a operatively mounted plant soil temperature sensor, a operatively mounted light spectrum and intensity sensor, and wherein each shelf may have dedicated air pumps, heaters, heater temperature sensors, air flow regulators, irrigation water pumps, irrigation water heaters, irrigation water heater temperature sensors, irrigation drain systems, heat exchanger water pumps, heat exchanger water heaters, and heat exchanger water heater temperature sensors.

In various embodiments, an electronic computer system and circuitry may be operatively coupled and responsive to grow operation components, including water pumps, air blowers, mist fogger, air and water heaters, water temperature sensors, air temperature sensors, flow regulators, and user inputs; light spectrum sensor, grow shelf weight sensor, plant soil temperature sensor. A computer memory system may be operatively coupled and responsive to the grow operation control system circuitry to store the environmental control system software and record and display grow system data. The computer and memory system may maintain specific grow operation component set-points, over time, to establish and maintain microclimate VPD, light intensity and spectrum, light interval, CO2 diffusion, air temperature, air flow, air humidity, irrigation water flow and temperature, and soil temperature to optimize a desired plant growth, plant height, root growth, or plant expression within the growing chamber and variable for any grow shelf or plant row.

In various embodiments, the system may execute a method of healing grafted plants for lower plant height and low auxiliary roots by controlling microclimate VPD, air temperature, air humidity, substrate temperature, CO2 levels, light spectrum, intensity and duration, irrigation water temperature and levels, and vertical air velocity per Table 2. The method of healing grafted plants for high plant height and high auxiliary roots may include controlling microclimate VPD, air temperature, air humidity, substrate temperature, CO2 levels, light spectrum, intensity and duration, irrigation water temperature and levels, and vertical air velocity per Table 3. A method of optimizing plant cuttings for maximum root growth and plant quality may control light intensity, spectrum, air/substrate temperature, humidity and VPD within the growing chamber per Table 4. The method of optimizing field transplant production may tend to optimize root development, shoot growth and plant compactness by controlling microclimate light spectrum, light intensity, light duration, air humidity, air temperature, VPD, moisture content, substrate temperature, and CO2 per Table 5.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Devices, systems, and methods are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. A device comprising:
    a rack;
    a shelf disposed in the rack, the shelf comprising a bottom surface and a plurality of side walls extending at an angle from the bottom surface;
    a grate disposed over the bottom surface, the grate configured to support growing containers;
    a heat exchanger disposed between the grate and the bottom surface to indirectly heat the growing containers supported by the grate;
    a light source disposed above the shelf and configured to light the growing containers;
    an irrigation system coupled to the shelf, the irrigation system comprising:
        a pump;
        a reservoir in fluid communication with the pump through a first conduit and in fluid communication with the shelf through a second conduit;
    an air delivery system in fluid communication with the shelf, the air delivery system comprising:
        a wet air delivery system in fluid communication with the shelf, the wet air delivery system comprising a fogger in fluid communication with a first blower and configured to deliver wet air to the air delivery system;
        a dry air delivery system in fluid communication with the shelf, the dry air delivery system comprising a second blower configured to deliver dry air to the air delivery system;
        a manifold configured mix to the dry air and the wet air to generate mixed air; and
        a nozzle disposed above the growing containers and configured to deliver the mixed air vertically and at a first variable rate, wherein the dry air delivery system delivers the dry air vertically and at a second variable rate, wherein the wet air delivery system delivers the wet air vertically and at a third variable rate; and a controller in electronic communication with the light source, the irrigation system, and the air delivery system to control a microclimate of the shelf.

2. The device of claim 1, further comprising an enclosure disposed about the shelf to maintain the microclimate differing from an ambient condition, wherein the enclosure is configured to allow vertical delivery of at least one of the mixed air, the dry air, or the wet air.

3. The device of claim 1, wherein the side walls reflect light from the light source.

4. The device of claim 1, wherein the controller is configured to maintain a temperature of the microclimate and a relative humidity of the microclimate.

5. The device of claim 1, wherein the controller is configured to maintain a vapor pressure deficit (VPD) of the microclimate.

6. The device of claim 5, further comprising a carbon dioxide source in fluid communication with the dry air delivery system, wherein the controller maintains the VPD, a temperature, a carbon dioxide concentration, a humidity, a light intensity, a light spectrum and an air velocity according to a VPD recipe.

7. A device comprising:

a rack;

a shelf disposed in the rack, the shelf comprising a bottom surface and a plurality of side walls extending at an angle from the bottom surface;

a grate disposed over the bottom surface, the grate configured to support growing containers;

a heat exchanger disposed between the grate and the bottom surface to indirectly heat the growing containers supported by the grate;

a light source disposed above the shelf and configured to light the growing containers;

an irrigation system coupled to the shelf, the irrigation system comprising:

a pump;

a reservoir in fluid communication with the pump through a first conduit and in fluid communication with the shelf through a second conduit;

an air delivery system in fluid communication with the shelf and comprising:

a wet air delivery system including a fogger in fluid communication with a first blower and configured to deliver wet air to the air delivery system, wherein the wet air delivery system delivers the wet air at a first variable rate;

a dry air delivery system including a second blower configured to deliver dry air to the air delivery system, wherein the dry air delivery system delivers the dry air at a second variable rate;

a manifold configured mix to the dry air and the wet air to generate mixed air; and a nozzle disposed above the growing containers and configured to deliver the mixed air vertically and at a third variable rate; and a controller in electronic communication with the light source, the irrigation system, and the air delivery system to control a microclimate of the shelf.

8. The device of claim 7, further comprising an enclosure disposed about the shelf to maintain the microclimate differing from an ambient condition.

9. The device of claim 7, wherein the side walls reflect light from the light source.

10. The device of claim 7, wherein the controller is configured to maintain a temperature of the microclimate and a relative humidity of the microclimate.

11. The device of claim 7, wherein the controller is configured to maintain a vapor pressure deficit (VPD) of the microclimate.

12. The device of claim 11, wherein the controller maintains the VPD according to a VPD recipe.

13. The device of claim 11, further comprising a carbon dioxide source in fluid communication with the dry air delivery system, wherein the controller maintains the VPD, a temperature, a carbon dioxide concentration, a humidity, a light intensity, a light spectrum and an air velocity according to a VPD recipe.

14. A device comprising:

a rack;

a shelf disposed in the rack, the shelf comprising a bottom surface and a plurality of side walls extending at an angle from the bottom surface;

a grate disposed over the bottom surface, the grate configured to support growing containers, the grate disposed above a heat exchanger;

a light source disposed above the shelf and configured to light the growing containers;

an irrigation system coupled to the shelf, the irrigation system comprising:

a pump;

a reservoir in fluid communication with the pump through a first conduit and in fluid communication with the shelf through a second conduit;

an air delivery system in fluid communication with the shelf, and comprising:

a wet air delivery system including a fogger in fluid communication with a first blower and configured to deliver wet air at a first variable rate;

a dry air delivery system including a second blower configured to deliver dry air at a second variable rate;

a manifold configured to mix the dry air and the wet air to generate mixed air; and a nozzle disposed above the growing containers and configured to deliver the mixed air vertically and at a third variable rate, the air delivery system configured to deliver mixed air through a tip of the nozzle disposed over the growing containers, the mixed air comprising a mixture of dry air and wet air; and a controller in electronic communication with the light source, the irrigation system, and the air delivery system to control a microclimate of the shelf.

15. The device of claim 14, further comprising an enclosure disposed about the shelf to maintain the microclimate differing from an ambient condition.

16. The device of claim 14, wherein the side walls reflect light from the light source.

17. The device of claim 14, wherein the controller is configured to maintain a temperature of the microclimate and a relative humidity of the microclimate.

18. The device of claim 14, wherein the controller is configured to maintain a vapor pressure deficit (VPD) of the microclimate according to a VPD recipe.

19. The device of claim 18, further comprising a carbon dioxide source in fluid communication with the dry air delivery system, wherein the controller maintains the VPD, a temperature, a carbon dioxide concentration, a humidity, a light intensity, a light spectrum and an air velocity according to a VPD recipe.

\* \* \* \* \*